US012552055B2

(12) United States Patent
Gallegos

(10) Patent No.: US 12,552,055 B2
(45) Date of Patent: Feb. 17, 2026

(54) RETRACTABLE UTILITY KNIFE

(71) Applicant: Slice, Inc., Sunny Isles, FL (US)

(72) Inventor: Robert Joseph Gallegos, Fremont, CA (US)

(73) Assignee: Slice Safety Cutter, Inc., Irvine, CA (US)

( * ) Notice: Subject to any disclaimer, the term of this patent is extended or adjusted under 35 U.S.C. 154(b) by 65 days.

(21) Appl. No.: 18/487,584

(22) Filed: Oct. 16, 2023

(65) Prior Publication Data

US 2024/0033955 A1 Feb. 1, 2024

Related U.S. Application Data

(63) Continuation of application No. 17/948,183, filed on Sep. 19, 2022, now Pat. No. 11,787,072, which is a continuation of application No. 17/306,901, filed on May 3, 2021, now Pat. No. 11,446,832, which is a continuation-in-part of application No. 16/188,108, filed on Nov. 12, 2018, now Pat. No. 10,994,428, which is a continuation of application No. 15/043,535, filed on Feb. 13, 2016, now Pat. No. 10,124,495, which is a continuation-in-part of application No. 14/106,678, filed on Dec. 13, 2013, now Pat. No. 9,579,808, and a continuation-in-part of application No. 14/101,729, filed on Dec. 10, 2013, now Pat. No. 9,364,958.

(60) Provisional application No. 61/739,710, filed on Dec. 19, 2012, provisional application No. 61/739,712, filed on Dec. 19, 2012.

(51) Int. Cl.
*B26B 1/08* (2006.01)
*B26B 5/00* (2006.01)

(52) U.S. Cl.
CPC ................ *B26B 1/08* (2013.01); *B26B 5/003* (2013.01)

(58) Field of Classification Search
CPC ............ B26B 1/08; B26B 5/003; B26B 5/001
USPC ......... 30/162, 286, 123, 124, 125, 335, 340, 30/342, 151, 293, 344; 222/80, 191, 192; 606/166–172, 181; 401/185, 195; 9/177, 9/85
See application file for complete search history.

(56) References Cited

U.S. PATENT DOCUMENTS

| | | | | |
|---|---|---|---|---|
| 5,303,475 A * | 4/1994 | Baker | B23D 29/026 | 30/237 |
| 5,890,294 A * | 4/1999 | Keklak | B26B 5/001 | 30/125 |
| 6,623,499 B1 * | 9/2003 | Andreini | A61B 17/3211 | 30/329 |
| 8,931,180 B2 * | 1/2015 | Davis | B26B 5/003 | 30/162 |
| 10,800,053 B1 * | 10/2020 | Liu | B26B 5/003 | |

(Continued)

*Primary Examiner* — Ghassem Alie
(74) *Attorney, Agent, or Firm* — Fox Rothschild LLP

(57) ABSTRACT

A utility knife configured with a retractable cutting blade that is extended and retracted by a blade actuation mechanism. The blade actuation mechanism employs a blade trigger assembly and a blade carriage assembly that are operably connected in variety of configurations. Certain configurations of the blade actuation mechanism utilize a rack-and-pinion arrangement between the blade trigger assembly and the blade carriage assembly, which enables the automatic retraction of the cutting blade as the cutting blade is lifted from the cutting surface.

10 Claims, 17 Drawing Sheets

(56) References Cited

U.S. PATENT DOCUMENTS

| | | | | |
|---|---|---|---|---|
| 11,254,020 | B2 * | 2/2022 | Liu | B26B 5/003 |
| 2003/0154606 | A1 * | 8/2003 | Saunders | B26B 5/003 30/162 |

* cited by examiner

RETRACTABLE UTILITY KNIFE

CROSS-REFERENCE TO RELATED APPLICATIONS

This application is a continuation of U.S. Non-Provisional Utility patent application Ser. No. 17/948,183, filed Sep. 19, 2022, and entitled "Retractable Utility Knife", which is a continuation of U.S. Non-Provisional Utility patent application Ser. No. 17/306,901, filed May 3, 2021, and entitled "Retractable Utility Knife", which is a continuation-in-part of U.S. Non-Provisional Utility patent application Ser. No. 16/188,108, filed Nov. 12, 2018, and entitled "Retractable Utility Knife", which is a continuation of U.S. Non-Provisional Utility patent application Ser. No. 15/043,535, filed Feb. 13, 2016, and entitled "Retractable Utility Knife" which is a continuation-in-part of both (i) U.S. Non-Provisional Utility patent application Ser. No. 14/101,729, filed Dec. 10, 2013, and entitled "Pen Cutter", which claims the benefit of U.S. Provisional Patent Application No. 61/739,710 filed on Dec. 19, 2012 and entitled "Pen Cutter" and (ii) U.S. Non-Provisional Utility patent application Ser. No. 14/106,678, filed Dec. 13, 2013, and entitled "Pocket Cutter", which claims the benefit of U.S. Provisional Patent Application No. 61/739,712 filed on Dec. 19, 2012 and entitled "Pocket Cutter", the entire disclosures of each and all of the above mentioned references are hereby incorporated herein by reference.

FIELD OF THE INVENTION

The present invention generally relates to a utility knife with a retractable cutting blade. Specifically, embodiments of the present invention relate to a utility knife apparatus with a self-retracting cutting blade, including embodiments where the cutting blade is automatically retracted when the cutting blade is lifted from the cutting surface.

BACKGROUND

Utility knifes may be designed in a variety of configurations and include any number of features to improve the safety and ergonomics of the tool. One feature of a utility knife is a cutting blade that can be retracted into the body of the utility knife to improve safety. However, the cutting blade of currently available utility knives is not retracted until a user releases or retracts the button or other actuator that is used to extend the cutting blade. This creates a safety hazard, as the cutting blade remains extended even after the cutting blade is lifted from the cutting surface. Furthermore, the design of traditional utility knifes is such that the cutting blade is only extended when a button or other actuator is pushed toward the end of the utility knife from which cutting blade extends. However, such a design is not ideal from an ergonomic perspective as it requires a user to stretch their thumb or finger to extend the cutting blade out of the body of the utility knife. Given the fact that utility knifes use a pulling motion to make a cut, this requires a user to extend and hold their thumb or finger in one direction while pulling their hand in the opposite direction, thereby creating a situation where the blade extending motion is in the opposite direction of the cutting motion. This motion can cause excessive fatigue and stress on hand and fingers, which may weaken grip and lead to unsafe use of the utility knife.

Therefore, there is a need in the art for a utility knife that employs an actuation mechanism that enables both (i) an automatic retraction of the cutting blade when the cutting blade is lifted from the cutting surface, regardless of whether the trigger or slider button has been released from the blade extending position and (ii) a blade extension motion with enhanced ergonomics that, whether through the operation of (A) a squeeze trigger or (B) a slider button that is pulled toward the opposite end of the utility knife from which the cutting blade extends, more closely aligns the user hand forces used to cause the blade extension motion with the user hand forces used to impart the cutting motion. These and other features and advantages of the present invention will be explained and will become obvious to one skilled in the art through the summary of the invention that follows.

SUMMARY OF THE INVENTION

Accordingly, it is an aspect of the present invention to provide a utility knife with a blade actuation mechanism that extends a cutting blade through the operation of a squeeze trigger or by moving a slider button toward the opposite end of the utility knife from which the cutting blade extends. Furthermore, it is an aspect of the present invention to provide a blade actuation mechanism that enables the cutting blade to be retracted automatically when the cutting blade is lifted from the cutting surface and regardless of whether the use has released the squeeze trigger or slider button from the blade extending position.

According to an embodiment of the present invention, an automatically retracting utility knife comprising, a blade actuation mechanism comprising, a squeeze lever formed with a squeeze lever pivot point at a front portion of the squeeze lever and a trigger slide pivot point at a middle portion of the squeeze lever, wherein the squeeze lever pivot point is configured to pivot on a post formed on a housing of the automatically retracting utility knife, a blade carriage formed with a blade holder and a linear gear, a slider rack formed with a linear gear, a pinion gear positioned between the linear gear of the blade carriage and the linear gear of the slider rack to create a rack-and-pinion arrangement between the blade carriage and the slider rack, a trigger slide that is reversibly connected to the slider rack and is formed with a squeeze lever slot, wherein the squeeze lever slot is configured to receive the trigger slide pivot point and causes the trigger slide to move the slider rack toward a rear end of the housing of the automatically retracting utility knife when the squeeze lever is depressed into the housing of the automatically retracting utility knife, wherein the blade carriage moves toward a front end of the housing of the automatically retracting utility knife as the slider rack moves toward the rear end of the housing of the automatically retracting utility knife, and a tension component attached to the blade carriage, wherein the tension component biases the blade carriage to the rear end of the housing of the automatically retracting utility knife and causes a cutting blade retained by the blade holder to be automatically retracted when the cutting blade is lifted from a cutting surface whether or not the squeeze lever is released from within the housing of the automatically retracting utility knife.

According to an embodiment of the present invention, the automatically retracting utility knife further comprises a blade trigger lock that is configured to toggle between a locked position and an unlocked position, wherein the locked position is characterized by a portion of the blade lock trigger blocking movement of the squeeze lever by engaging with a trigger lock notch formed in one or more of the trigger slider, the slider rack, and the blade carriage.

According to an embodiment of the present invention, the blade trigger lock is formed in a top edge portion of the housing of the automatically retracting utility knife.

According to an embodiment of the present invention, the automatically retracting utility knife further comprises a blade release button configured on an outer portion of the housing of the automatically retracting utility knife, wherein the blade release button is configured to flex inward to release the cutting blade from the blade holder when the cutting blade is in a retracted position within the housing of the automatically retracting utility knife.

According to an embodiment of the present invention, the automatically retracting utility knife further comprises a blade release tab retained within the blade holder and configured to reversibly engage with a notch in the cutting blade, wherein flex the blade release button inward causes the blade release tab to disengage with the notch in the cutting blade.

According to an embodiment of the present invention, the automatically retracting utility knife further comprises a blade release pressure plate positioned between the blade release button and the blade holder.

According to an embodiment of the present invention, the automatically retracting utility knife further comprises a slider pin retained in a depression formed in the trigger slide.

According to an embodiment of the present invention, the slider pin slides upward in the depression formed in the trigger slide as the trigger slide moves toward the rear end of the housing of the automatically retracting utility knife when the squeeze lever is depressed into the housing of the automatically retracting utility knife.

According to an embodiment of the present invention, the automatically retracting utility knife further comprises a lever arm formed on the slider rack, wherein the slider pin engages with the lever as the trigger slide moves toward the rear end of the housing of the automatically retracting utility knife when the squeeze lever is depressed into the housing of the automatically retracting utility knife.

According to an embodiment of the present invention, an automatically retracting utility knife comprising a blade actuation mechanism comprising, a squeeze lever formed with a squeeze lever pivot point at a front portion of the squeeze lever and a lever ramp pivot point at a middle portion of the squeeze lever, wherein the squeeze lever pivot point is configured to pivot on a post formed on a housing of the automatically retracting utility knife, a blade carriage formed with a blade holder and a squeeze lever ramp, wherein the lever ramp pivot point is configured to slide along the squeeze lever ramp to move the blade carriage toward a front end of the housing of the automatically retracting utility knife when the squeeze lever is depressed into the housing of the automatically retracting utility knife, and a tension component attached to the blade carriage, wherein the tension component biases the blade carriage to a rear end of the housing of the automatically retracting utility knife and causes a cutting blade retained by the blade holder to be automatically retracted when the squeeze lever is released from within the housing of the automatically retracting utility knife; and a blade release button configured on an outer portion of the housing of the automatically retracting utility knife, wherein the blade release button is configured to flex inward to release the cutting blade from the blade holder when the cutting blade is in a retracted position within the housing of the automatically retracting utility knife.

According to an embodiment of the present invention, the automatically retracting utility knife further comprises a blade trigger lock that is configured to toggle between a locked position and an unlocked position, wherein the locked position is characterized by a portion of the blade lock trigger blocking movement of the squeeze lever by engaging with a trigger lock notch formed in the blade carriage.

According to an embodiment of the present invention, an automatically retracting utility knife comprising a blade actuation mechanism comprising a squeeze trigger operably connected to trigger slide, a slider rack, and a blade carriage configured to retain a cutting blade, wherein the trigger slide is detachably connected to the slider rack and the slider rack is operably connected to the blade carriage such that when the cutting blade is engaged with a cutting surface, the blade carriage is pulled forward thereby causing the slider rack to move rearward and disconnect from the trigger slide thereby interrupting an indirect connection between the trigger slide and the blade carriage and permitting the blade carriage to be automatically retracted by a tension component when the cutting blade is lifted from the cutting surface regardless of whether the squeeze trigger has been released.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

Figure 1:
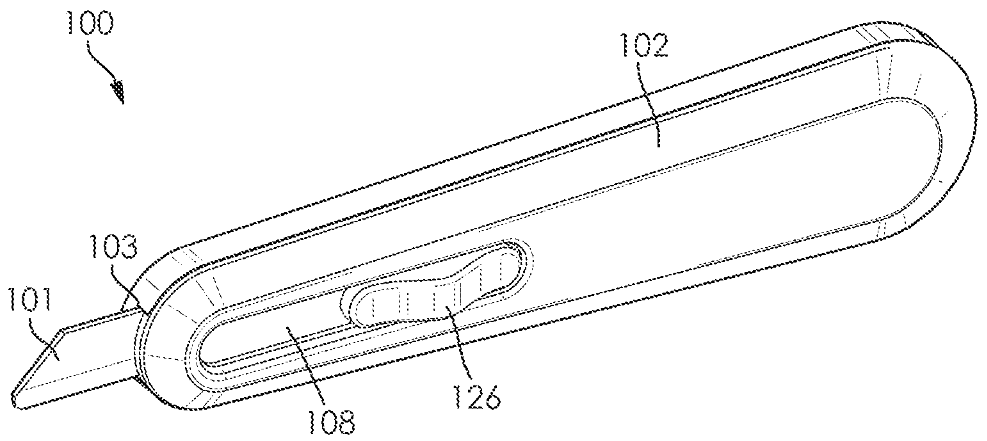
FIG. 1 is a front, left-side perspective view of a utility knife in accordance with a first embodiment of the present invention utilizing a slider knob blade trigger.

The present invention generally relates to a utility knife with a retractable cutting blade. Specifically, embodiments of the present invention relate to a utility knife apparatus with a self-retracting cutting blade, including embodiments where the cutting blade is automatically retracted when the cutting blade is lifted from the cutting surface or material being cut. The cutting blade of the utility knife is extended and retracted via a blade actuation mechanism. Embodiments of the present invention include a blade actuation mechanism with a rack-and-pinion configuration.

According to an embodiment of the present invention, the utility knife described herein comprises a housing shell, a blade actuation mechanism, a cutting blade, one or more tension components, and one or more weights. Certain embodiments of the present invention may include fewer components or additional components depending on the particular use requirements of the utility knife. One of ordinary skill in the art would appreciate that there are many optional components and configurations for a utility knife, and embodiments of the present invention are contemplated for use with any such component or configuration.

According to an embodiment of the present invention, the utility knife is constructed from any suitable variety of durable materials. In a preferred embodiment, the majority of the components of the utility knife are primarily formed from plastic or a plastic composite material. In an alternate embodiment, the components of the utility knife may be formed from a metal or metal alloy. In the preferred embodiment, the various components of the utility knife may be constructed from multiple different materials, for example, with i) the housing shell, blade trigger assembly, and blade carriage assembly being constructed of a plastic material; ii) the tension component and weight from metal; and iii) the cutting blade from ceramic. In a preferred embodiment, certain components of the utility knife may be formed from a specific material based upon the application or function of a given component. As an illustrative example, certain portions of the housing shell be made from glass filled nylon or a polyamide plastic that is more resistant to wear and therefore able to withstand the constant friction the front portion of the utility knife encounters while in contact with a cutting surface. Similarly, the housing shell may be made from a metal or metal alloy for increased durability. The cutting surface may be the material that is being cut by the utility knife or the surface on which the material is being cut. One of ordinary skill the art would appreciate that there are numerous suitable materials from which the components of the utility knife could be constructed, and embodiments of the present invention are contemplated for use with any such material.

According to an embodiment of the present invention, the housing shell of the utility knife defines an interior cavity configured to receive and retain the blade actuation mechanism, the cutting blade, the one or more tension components, and the one or more weights. In some embodiments, the interior cavity of the housing shell may also be formed with a blade storage compartment configured to receive a blade storage drawer. In a preferred embodiment, the housing shell may comprise two corresponding halves, a left-half housing shell and a right-half housing shell, that are configured to retain the other components of the utility knife. The preferred embodiment of the housing shell may further comprise a front housing engagement means and a rear housing engagement means that are configured to align and connect the left-half housing shell with the right-half housing shell. In some embodiments, the inner surface of the housing shell may be formed with one or more recesses or groves that are configured to retain at least a portion of a tension component. Finally, the preferred embodiment of the housing shell may further comprise a blade outlet slot at the front edge of the utility knife and a lanyard attachment point at the rear edge of the utility knife. In the preferred embodiment, the housing shell may be substantially flat, with an elongated shape that is rounded at each end and generally symmetrical along the longitudinal axis. In some embodiments, one end of the housing shell may be enlarged in one or more dimensions relative to the other end of the housing shell in order to provide adequate space for said blade storage compartment, an increased grip area, and additional ergonomic comfort. One of ordinary skill in the art would appreciate that the housing shell could be designed in any number of configurations, and embodiments of the present invention are contemplated for use with any such configuration.

According to an embodiment of the present invention, the housing shell of the utility knife includes a left-half housing shell. In a first preferred embodiment, the left-half housing shell comprises a blade trigger channel, a blade trigger opening, a blade trigger post, and a blade trigger track. The blade trigger channel is formed on the exterior surface of the left-half housing shell, while the blade trigger opening is a void formed in the blade trigger channel that creates a passage to the internal portion of the utility knife. The blade trigger post and the blade trigger track are formed on the inner surface of the left-half housing shell. In some embodiments, the interior of the left-half housing shell may also include slider pin grooves that guide the movement of the slider pin. One of ordinary skill in the art would appreciate that are numerous suitable configurations for the left-half housing shell of the utility knife, and embodiments of the present invention are contemplated for use with any such configuration.

According to an embodiment of the present invention, the exterior surface of the left-half housing shell of the utility knife may be configured with a blade trigger channel and a blade trigger opening. In a preferred embodiment, the blade trigger channel is a depression formed in the left-half housing shell, while the blade trigger opening is an opening in the left-half housing shell that is substantially contained within the blade trigger channel. In the preferred embodiment, the blade trigger channel defines the movement path of the blade trigger, while the blade trigger opening allows portions of the blade trigger to pass through the left-half housing shell to engage with the blade carrier assembly. In an alternate preferred embodiment, the blade trigger channel is formed on the top edge of the utility knife at the point where the left-half housing shell connects to the right-half housing shell, with the blade trigger opening still being a void formed in the blade trigger channel that creates a passage to the internal portion of the utility knife. In an alternate preferred embodiment where the blade trigger is a squeeze lever, there is no blade trigger channel and instead the blade trigger opening is formed in the bottom edge of the utility knife where the left-half housing shell connects to the right-half housing shell. The blade trigger opening is formed in the bottom edge of the housing shell to enable the squeeze lever to move inside the housing shell when the blade actuation mechanism is actuated.

According to an embodiment of the present invention, the interior surface of the left-half housing shell may be configured with a blade trigger post, a blade trigger track, or any combination thereof. In a preferred embodiment, the blade trigger post is a protrusion that extends perpendicularly from the inner surface of the left-half housing shell, while the blade trigger track is a plurality of ribs and/or channels on the inner surface of the left-half housing shell. In the preferred embodiment, the blade trigger post is adapted to guide and limit the movement range of the blade trigger assembly within the housing shell by defining the movement boundary of the blade trigger assembly, while the blade trigger track defines and guides the movement of the blade trigger assembly between a retracted position and an extended position. In some embodiments of the utility knife, the blade trigger post may not be present and movement of the blade trigger assembly or trigger assembly may be limited by other components of the utility knife. In some embodiments, the inner surface of the left-half housing shell is also formed with a series of indentations on the inner surface of the blade trigger channel or inner edge of the blade trigger opening. In the preferred embodiment, the indentations function as locking points that are configured to reversibly engage with the lock lever tabs of the button lock lever, or with one or more lock lever tabs that are formed on the blade carriage, as the cutting blade is extended in a stepwise manner. One of ordinary skill in the art would appreciate that there are many suitable designs for an inside surface of a left-half housing shell, and embodiments of the present invention are contemplated for use with any such design.

According to an embodiment of the present invention, the housing shell of the utility knife includes a right-half housing shell. In a preferred embodiment, the right-half housing shell may be configured with a blade access panel, blade carriage post, a blade carriage track, a blade release button, or any combination thereof. In the preferred embodiment, and when so equipped, the blade access panel and/or the blade release button is located on the front, exterior surface of the right-half housing shell. The blade carriage post and the blade carriage track are formed on or otherwise attached to the inner surface of the right-half housing shell. One of ordinary skill in the art would appreciate that are numerous suitable configurations for the right-half housing shell of the utility knife, and embodiments of the present invention are contemplated for use with any such configuration.

According to an embodiment of the present invention, the right-half housing shell includes a blade access panel. In a preferred embodiment, the blade access panel is a removable portion of the right-half housing shell that provides access to the cutting blade. In the preferred embodiment, the blade access panel further comprises an access panel lock. The access panel lock primarily comprises a rotating latch that extends through an aperture formed in the blade access panel. The access panel lock can be rotated between a locked and an unlocked position. When the access panel lock is rotated to the unlocked position, the blade access panel can be removed from the rest of the right-half housing shell. In the preferred embodiment, the rotating latch primarily comprises an outer slotted disk that passes through the aperture of the blade access panel and connects to an inner latching component. The inner latching component is configured with an extension flange that hooks behind the inner wall of the right-half housing shell when the access panel lock is in the locked position, thereby securing the blade access panel in place. Additionally, the exterior surface of the blade access panel or right-half housing shell may further include a lock indicator that is adapted to show when the access panel lock is engaged. One of ordinary skill in the art would appreciate that are numerous suitable configurations for the right-half housing shell of the utility knife, and embodiments of the present invention are contemplated for use with any such configuration.

According to an embodiment of the present invention, the right-half housing shell includes a blade release button. In a preferred embodiment, the blade release button is a flexible tab formed as a partially detached portion of the wall of the right-half housing shell that is configured to be depressed and flexed inward. When the blade release button is flexed inward, the blade release button causes a blade release tab in the blade holder to disengage from the notch formed on the cutting blade thereby enabling a user to remove the cutting blade from the blade holder for a tool-free blade change. In some embodiments, a blade release pressure plate cooperates with the blade release button to cause the blade release tab to disengage from the cutting blade. In the preferred embodiment, the blade release pressure plate is sized to fit between the blade release button and the blade holder. The blade release pressure plate may also be formed to engage with or attach to a protrusion formed on the inner surface of the blade release button. In the preferred embodiment, as the blade release button is pushed inward, the blade release pressure plate is likewise moved toward the blade holder until the blade release pressure plate presses against the blade release tab.

According to an embodiment of the present invention, the interior surface of the right-half housing shell may be configured with a blade carriage post and a blade carriage track. In a preferred embodiment, the blade carriage post is a protrusion that extends perpendicularly from or attaches perpendicularly to the inner surface of the right-half housing shell, while the blade carriage track is a plurality of ribs and/or channels on the inner surface of the right-half housing shell. In the preferred embodiment, the blade carriage post is adapted to limit the movement range of the blade carriage assembly within the housing shell by defining the movement boundary of the blade carriage assembly, while the blade carriage track defines and guides the movement of the blade carriage assembly between a retracted position and an extended position. In some embodiments of the utility knife, the blade carriage post may not be present and movement of the blade carriage may be limited by other components of the utility knife. One of ordinary skill in the art would appreciate that there are many suitable designs for an inside surface of a right-half housing shell, and embodiments of the present invention are contemplated for use with any such design.

According to an embodiment of the present invention, the housing shell includes a front housing engagement means and a rear housing engagement means. In a preferred embodiment, the front housing engagement means are corresponding connector or alignment elements configured on the front portion of each of the left-half housing shell and the right-half housing shell, that are adapted to connect and align the front portion of housing shell. In a preferred embodiment, the rear housing engagement means are, similarly, corresponding connector or alignment elements configured on the rear portion of each of the left-half housing shell and the right-half housing shell, that are adapted to connect and align the rear portion of housing shell. In some embodiments, the left-half housing shell and right-half housing shell are connected or secured in place by one or more fastener elements, such as screws or bolts. In some embodiments, a fastener element may connect the left-half housing shell and right-half housing shell by passing through one of the left-half housing shell or right-half housing shell and engaging with a fastener receiving point formed in the other of the left-half housing shell and right-half housing shell. In some embodiments, the fastener elements may attach to one or more brackets retained within the housing shell. One of ordinary skill in the art would appreciate that the each of the housing engagement means could be arranged in a variety of configurations, and embodiments of the present invention are contemplated for use with any suitable configuration.

According to an embodiment of the present invention, the housing shell comprises a blade outlet slot and a lanyard attachment point. In a preferred embodiment, the blade outlet slot is formed on the edge of the front portion of the housing shell. In particular, the blade outlet slot is primarily formed from a notch in the front edge of the right-half housing shell. When the right-half housing shell is put together with the left-half housing shell, the complete blade outlet slot is fully shaped. In an alternate preferred embodiment, the blade outlet slot may be formed entirely in a front edge portion of either the left-half housing shell or the right-half housing shell, with the front edge portion of the applicable housing shell half being molded or otherwise shaped to engage with the other housing shell half that forms no part of the blade outlet slot. In the preferred embodiment, the lanyard attachment point is formed on the edge of the rear portion of the housing shell. In particular, the lanyard attachment point is primarily formed from by slot cut into the rear of the right-half housing shell. When the right-half housing shell is put together with the left-half housing shell, the complete lanyard attachment point is fully formed, providing an opening through the rear of the housing shell.

According to an embodiment of the present invention, a blade storage compartment is formed within one end of the housing shell. The opening to the blade storage compartment is at the opposite end of the utility knife from the blade outlet slot and is defined by notches formed in the left-half and right-half housing shells, where the housing shells would otherwise be connected but for those notches. In a preferred embodiment, the blade storage compartment is sized to receive a blade storage drawer that is removable from the end portion of the housing shell and guided by a groove or channel formed on the interior portion of the housing shell. In some embodiments, a blade drawer latch or blade drawer door may be used to secure the blade storage drawer within the housing shell. In a preferred embodiment, the blade drawer latch or blade drawer door is also retained within the end portion of the housing shell and is configured to slide up or down to permit the blade storage drawer to be removed from the housing shell. In some embodiments, the blade storage drawer, the blade drawer latch or blade drawer door, or any combination thereof may include or otherwise be attached to a biasing mechanism, such as a spring or other resilient member, that biases the blade storage drawer, the blade drawer latch or blade drawer door to an open or closed position, as desirable. As an illustrative example, a spring could be attached to the blade storage drawer to urge the drawer out of the housing shell when the blade drawer latch or blade drawer door is moved to an open position. While there are many suitable designs, sizes, and shapes for a blade storage drawer, one of ordinary skill in the art would appreciate the blade storage drawer could be optimally configured to retain a variety of suitable cutting blade shapes and sizes.

According an embodiment of the present invention, the utility knife includes a blade trigger lock. In a preferred embodiment, the blade trigger lock is a toggle switch configured to move between (i) an unlocked position in which blade trigger can freely actuate and move the cutting blade to an extended position and (ii) an locked position in which the blade trigger lock engages with one or more elements of the blade actuation mechanism to stop the blade trigger from being freely actuated and thereby preventing the cutting blade from being moved to extended position. In the preferred embodiment, the blade trigger lock is positioned in the edge of the housing shell along the top edge of the utility knife. In the locked position, a portion of the blade trigger lock is configured to block the movement of one or more of the components of the blade actuation mechanism, including but not limited to the blade trigger, the slider rack, and the blade carriage. As an illustrative example, the blade trigger lock may be formed with a flange that engages with a corresponding notch formed in the blade trigger, the slider rack, or the blade carriage. When so engaged, the blade trigger lock obstructs the movement of that particular component of the blade actuation mechanisms, which prevents movement of the overall blade actuation mechanism, and thereby the blade trigger, when a user attempts to actuate the blade trigger to extend the cutting blade.

According to an embodiment of the present invention, the utility knife includes a blade actuation mechanism. In a preferred embodiment, the blade actuation mechanism primarily comprises a blade trigger assembly and a blade carriage assembly, and may further include one or more tension components. In some embodiments, the blade actuation mechanism also includes a pinion gear. In the preferred embodiment, a portion of both the blade trigger assembly and the blade carriage assembly are configured as a linear gear. The linear gear portions of the blade actuation mechanism, along with a pinion gear arranged between those linear gear portions, enable a rack-and-pinion action for the blade actuation mechanism. In particular, a pinion gear that rotates around a pinion gear post formed on the inner surface of the housing shell allows for the movement of the blade trigger assembly to be transferred to the blade carriage assembly without a direct connection between the blade trigger assembly and the blade carriage assembly. Furthermore, the mechanical relationship between the blade trigger assembly and the blade carriage assembly, as facilitated by the pinion gear, allow for movement of the blade trigger assembly, or portions thereof, in one direction to cause movement of the blade carriage assembly in the opposing direction. For example, the rack-and-pinion action enables a user of the utility knife to slide the slider knob of the blade trigger toward the rear of the utility knife to in turn cause the blade carriage assembly to slide toward the front on the utility knife, extending the cutting blade. Alternatively, in embodiments where a squeeze lever is employed, the rack-and-pinion action enables a user of the utility knife to translate the movement of the squeeze lever into the housing shell, and the associated rearward movement of the other components of the blade trigger that is caused by the movement of the squeeze lever into the housing shell, into the forward movement of blade carriage assembly, which causes extension of the cutting blade. As the blade carriage assembly slides toward the front of the utility knife, the cutting blade is extended out of the housing shell through the blade outlet slot. The rack-and-pinion action also enables the cutting blade to be automatically retracted when the cutting blade is lifted off the cutting surface.

According to an embodiment of the present invention, the blade actuation mechanism features a direct connection between the blade trigger assembly and the blade carriage assembly. In a preferred embodiment, the blade trigger assembly connects directly to the blade carriage assembly. This is in contrast to the rack-and-pinion arrangement previously described, which features and indirect linkage between the blade trigger assembly and the blade carriage assembly. In the preferred embodiment, the direct connection of the blade trigger assembly and the blade carriage assembly create a direct movement relationship between the blade trigger assembly and the blade carriage assembly, wherein the blade trigger assembly and the blade carriage assembly move in unison and in the same direction. For example, as a user slides the blade trigger of the utility knife forward, the entire blade trigger assembly, along with the blade carriage assembly, will also be moved toward the front of the utility knife. As the blade carriage assembly slides toward the front of the utility knife, the cutting blade is extended out of the housing shell through the blade outlet slot.

According to an embodiment of the present invention, the blade actuation mechanism includes a blade trigger assembly. In a preferred embodiment, the blade trigger assembly comprises a blade trigger, a slider rack, and a slider pin. In some embodiments, the blade trigger assembly is secured to the blade trigger post with a washer or similar retention component that allows the blade trigger assembly to remain movable. Alternatively, in embodiments where the blade trigger is a squeeze lever, a squeeze lever pivot point is formed in a front portion of the squeeze lever and the squeeze lever pivot point hinges on a blade trigger post formed near the blade trigger opening in the bottom edge of the housing shell. In the preferred embodiment, the slider rack is the primary component of the blade trigger assembly that interacts with the pinion gear and blade carriage assembly to enable the rack-and-pinion action of the blade actuation mechanism. In an alternate preferred embodiment, the blade trigger assembly only includes the blade trigger, where the blade trigger assembly and blade carriage assembly are directly connected. One of ordinary skill in the art would appreciate there are many suitable configurations for a blade trigger assembly and embodiments of the present invention are contemplated for use with any such configuration.

According to an embodiment of the present invention, the blade trigger assembly includes a blade trigger. In a preferred embodiment, the blade trigger comprises a slider knob and a trigger slide that is continuously formed therewith. In some embodiments, the slider knob is separate from but connectable to the trigger slide. In the preferred embodiment, the slider knob is the portion of the blade trigger that the user engages with to slide, press, or otherwise engage the blade actuation mechanism. In some embodiments, the trigger slide is the portion of the blade trigger that is configured to connect, directly or indirectly, via the pinion gear and slider rack, to the blade carriage. In some embodiments, the trigger slide of the blade trigger is configured with a slider pin recess that is adapted to receive a slider pin. While the movement of the slider knob is largely guided by the blade trigger channel on the outside of the housing shell, the trigger slide of the blade trigger is guided by portions of the blade trigger track on the inside surface of the housing shell. In some embodiments, the blade trigger may be further configured with a button lock lever extending from the back of the slider knob or trigger slide that enables the blade trigger to lock the cutting blade at a set extension length. In the preferred embodiment, the slider knob may be flat, ribbed, or humped. One of ordinary skill in the art would appreciate that there are many suitable configurations for the blade trigger depending upon the particular application, and embodiments of the present invention are contemplated for use with any such configuration.

In an alternate preferred embodiment, the blade trigger comprises a squeeze lever and a and a separate trigger slide. In the alternate preferred embodiment, the squeeze lever is a hand grip that can be squeezed by the user to engage the blade actuation mechanism. In the alternate preferred embodiment, the trigger slide is the portion of the blade trigger that is configured to connect, directly or indirectly, via the pinion gear and slider rack, to the blade carriage. Furthermore, the trigger slide of the blade trigger may be configured with a slider pin recess that is adapted to receive a slider pin. In the preferred embodiment, the squeeze lever is configured to pivot into the housing shell by rotating about a squeeze lever pivot point formed in a front portion of the squeeze lever. Within the housing shell, the squeeze lever is slidably connected to the trigger slide that is retained within the housing shell. In the preferred embodiment, a trigger slide pivot point on the squeeze lever connects to a squeeze lever slot on the trigger slide. In some embodiments, the trigger slide is connected to the squeeze lever via a pin, bolt, rivet, screw, or other type of connector. In some embodiments, the squeeze lever may be formed with ridges or ribbing to improve grip. In some embodiments, the squeeze lever may be slidably engaged with the blade carriage directly without utilizing a trigger slide, slider rack, or pinion gear. One of ordinary skill in the art would appreciate that there are many suitable configurations for the squeeze level, and embodiments of the present invention are contemplated for use with any such configuration.

In various embodiments of the utility knife, ambidextrous use of the utility knife is possible. In embodiments where a slider knob version of the blade trigger is employed and the slider knob is on the side of the utility knife, a user may need to rotate the utility knife 180 degrees about its longitudinal axis and/or flip the orientation of cutting blade within the blade holder of the blade carriage for ambidextrous use. In embodiments where a squeeze lever is employed or the slider knob is on the edge of the utility knife, ambidextrous use is possible without rotating the utility knife or changing the orientation of the cutting blade within the blade holder.

According to an embodiment of the present invention, a button lock lever is formed on the rear surface of the blade trigger. In a preferred embodiment, the button lock lever is a flexible, substantially V-shaped appendage extending from the rear of the blade trigger. In the preferred embodiment, one arm of the button lock lever, the flexing arm, is configured to flex against the blade carriage, while the other arm of the button lock lever, the lock tab arm, is configured with lock lever tabs. The button lock lever passes through the blade trigger opening such that the ends of each arm of the button lock lever are inside of the housing shell, thereby allowing the flexing arm to flexibly abut with the blade carriage and the lock lever tabs to engage with the locking points formed on the inner surface of the housing shell. In the preferred embodiment, button lock lever is configured to enable stepwise movement of the blade trigger and thereby the stepwise extension of the cutting blade. As the blade trigger is depressed inward, the flexing arm of the button lock lever flexes against the blade carriage, causing the lock tab arm to disengage with the locking points. The blade trigger, and therefore the cutting blade, can then be extended or retracted as desired. When the blade has been moved to the desired position, the blade trigger can be released, causing the flexing arm to return to its relaxed position and the lock tab arm to reengage with the locking points. The various locking points formed on the inside of the housing shell allow the blade trigger, and therefore the cutting blade, to be extended and retracted in a stepwise manner.

According to an embodiment of the present invention, the trigger slide of the blade trigger connects directly to the blade carriage assembly. In a preferred embodiment, one or more carriage engagement posts are formed on the trigger slide of the blade trigger. In the preferred embodiment, each carriage engagement post is configured to connect to a hole on the blade carriage or fit with one or more flanges on the blade carriage. This arrangement allows movement of the blade trigger to be directly transferred to the blade carriage assembly. One of ordinary skill in the art would appreciate that there are many suitable designs and configurations for a carriage engagement post, and embodiments of the present invention are contemplated for use with any such design or configuration.

According to an embodiment of the present invention, the trigger slide of the blade trigger is indirectly linked to the blade carriage assembly. In a preferred embodiment, the blade trigger links to the blade carriage assembly via the linkage created by the slider rack, slider pin, and pinion gear. In the preferred embodiment, the slider pin recess formed in the trigger slide of the blade trigger allows a portion of the slider pin to pass through the trigger slide to reversibly engage with the lever arm on the slider rack. This arrangement allows movement of the blade trigger to be indirectly transferred to the blade carriage assembly via the rack-and-pinion arrangement created between the slider rack, the blade carriage extension arm, and pinion gear.

According to an embodiment of the present invention, the trigger slide of the blade trigger is formed with a slider pin recess. In a preferred embodiment, the slider pin recess is a depression formed on the front of the trigger slide that is configured to retain the slider pin. In the preferred embodiment, slider pin recess is formed such that the slider pin can move up and down within the boundaries of the slider pin recess. The slider pin recess also includes a hole or void that allows a portion of the slider pin to pass completely through the trigger slide to engage with the slider rack. In some embodiments, in addition to the slider pin recess, the trigger slide is also configured with a slider rack engagement flange that extends from the back of the trigger slide. In the preferred embodiment, the slider rack engagement flange is configured to interact with the slider rack. One of ordinary skill in the art would appreciate that there are many suitable ways to form a slider pin recess, and embodiments of the present invention are contemplated for use with any such formation.

According to an embodiment of the present invention, the trigger slide of the blade trigger is configured with a slider post slot. In a preferred embodiment, the slider post slot is an opening formed in the trigger slide of the blade trigger that allows the blade trigger post to pass through the trigger slide of the blade trigger. By passing through the blade trigger, the blade trigger post can guide and limit the movement of the blade trigger, while also providing an attachment point for the washer that secures the blade trigger to the housing shell without completely immobilizing the blade trigger. The blade trigger slot may be configured in any suitable width to accommodate the blade trigger post and of any suitable length to facilitate the sliding motion of the blade trigger. In some embodiments, the trigger slide of the blade trigger may also include at least one tension component attachment point.

According to an embodiment of the present invention, the trigger slide of the blade trigger is formed with a squeeze lever slot. In a preferred embodiment, the squeeze lever slot is an opening formed in the trigger slide of the blade trigger that is configured to receive and slidably connect with a trigger slide pivot point formed at a middle portion of the squeeze lever of the blade trigger. In the preferred embodiment, the squeeze lever slot assists in guiding the movement of the squeeze lever so that the movement of the squeeze lever is appropriately transferred to the blade carriage assembly.

According to an embodiment of the present invention, the blade trigger assembly includes a slider pin. In a preferred embodiment, the slider pin primarily comprises a plate portion configured with ribbing or channel on the front of the plate portion and a rack lever latching post extending perpendicularly from the rear of the plate portion. In the preferred embodiment, the plate portion is configured to rest inside the slider pin recess of the trigger slide. The plate portion will also be able to slide within the slider pin recess to permit the slider pin to reversibly engage with the slider rack. In the preferred embodiment, the rack lever latching post passes through the trigger slide via the hole formed in the slider pin recess. After passing through the trigger slide, the rack lever latching post is able to reversibly engage with the lever arm of the slider rack. In particular, a hook or catch on the rack lever latching post engages with a corresponding hook or catch of the lever arm of the slider rack In the preferred embodiment, the ribbing or channel on the front of the plate portion is configured to correspond to the slider pin grooves on the inside of the housing shell. One of ordinary skill in the art would appreciate that there are many suitable designs for a slider pin, and embodiments of the present invention are contemplated for use with any such design.

According to an embodiment of the present invention, the blade trigger assembly includes a slider rack. In a preferred embodiment, the slider rack is an essentially C-shaped frame defined by an upper and lower lip extending perpendicularly from the rear of main body of the slider rack. In the preferred embodiment, the slider rack comprises a linear gear formed on the underside of the upper lip and a lever arm formed on the main body of the slider rack. The lever arm further comprises a hook or catch that reversibly engages with a corresponding hook or catch on the rack lever latching post of the slider pin. In the preferred embodiment, the C-shape of the slider rack enables the slider rack to receive the blade carriage between the upper and lower lip of the slider rack. In particular, the two components are aligned so that the blade carriage extension arm is above the topside of the lower lip of the slider rack, thereby causing the linear gear formed on the underside of the upper lip of the slider rack to align with the linear gear formed on the topside of the blade carriage extension arm. With the linear gear of both the slider rack and the blade carriage aligned, a pinion gear can be inserted between the two components so that movement of one component can be transferred to the other due to the rack-and-pinion relationship created between those components. One of ordinary skill in the art would appreciate that there are many suitable designs for a slider rack, and embodiments of the present invention are contemplated for use with any such design.

According to an embodiment of the present invention, the slider rack includes a series of grooves and channels that correspond with the blade trigger and blade carriage tracks on the inside of the housing shell. In the preferred embodiment, the front of the slider rack includes a groove at the top of the slider rack that interacts with and is guided by portions of the blade trigger track on the left-half housing shell. On the other hand, the upper and lower lips of the slider rack interact with and are guided by portions of the blade carriage track on the right-half housing shell. In some embodiments, the upper lip of the slider rack extends from the top edge of the slider rack, while the lower lip of the slider rack is set back from the bottom edge of the slider rack, thereby forming a groove defined by the bottom edge of the slider rack and the perpendicularly extending lower lip. In the preferred embodiment, the groove formed by the bottom edge of the slider rack and the lower lip of the slider rack corresponds to a portion of the blade carriage track. Overall, the slider rack is designed to correspond to features of both the left-half housing shell and right-half housing shell. Additional features of the slider rack may include, but are not limited to, a notch that corresponds to the blade trigger post and an upper lip overhang that extends the upper lip past the front edge of the main body of the slider rack. One of ordinary skill in the art would appreciate there are many option components and features that could be incorporated into a slider rack, and embodiments of the present invention are contemplated for use with any such component or feature.

According to an embodiment of the present invention, the slider rack includes a lever arm formed from the main body of the slider rack. In a preferred embodiment, the lever arm is a flexible appendage extending from the rear edge of the main body of the slider rack. In the preferred embodiment, the lever arm extends from the edge of the slider rack in the middle of an open notch that is cutout from the main body of the slider rack. The open notch provides sufficient room for the lever arm to flex when the lever arm is engaged with the slider pin. One of ordinary skill would appreciate that there are many possible configurations for a lever arm, and embodiments of the present invention are contemplated for use with any such configuration.

According to an embodiment of the present invention, the blade actuation mechanism includes a blade carriage assembly. In a preferred embodiment, the blade carriage assembly comprises a blade carriage, a blade holder cover, and a blade retention pin or blade release tab. In some embodiments, the blade carriage also includes one or more lock lever tabs that are configured to engage with indentations formed adjacent to the blade trigger channel or blade trigger opening. In some embodiments, the blade carriage assembly is secured to the blade carriage post with a washer or similar retention component that allows the blade carriage assembly to remain movable. In the preferred embodiment, the blade carriage is the primary component of the blade carriage assembly that interacts with the pinion gear and blade trigger assembly to enable the rack-and-pinion action of the blade actuation mechanism. In an alternate preferred embodiment, the blade trigger assembly and blade carriage assembly are directly connected, as opposed to an indirect connection via the pinion gear. One of ordinary skill in the art would appreciate there are many suitable configurations for a blade carriage assembly and embodiments of the present invention are contemplated for use with any such configuration.

According to an embodiment of the present invention, the blade carriage assembly includes the blade carriage. In a preferred embodiment, the blade carriage comprises a blade holder and a blade carriage extension arm. In the preferred embodiment, the blade holder is the portion of the blade carriage that is configured to retain the cutting blade, while the blade carriage extension arm is the portion of the blade carriage that is configured to either (i) directly connect to the blade trigger of the blade trigger assembly via the carriage engagement posts on the blade trigger or (ii) indirectly connect to the slider rack of the blade trigger assembly via the pinion gear. In the preferred embodiment, the blade holder is formed at one end of the blade carriage, with the blade carriage extension arm extending away from the blade holder. The blade carriage extension arm is attached to the back of the blade holder to create a slight offset between the blade carriage extension arm and blade holder, although the two components generally form a straight line. The offset between the blade holder and the blade carriage extension arm causes (i) the blade holder to align with the main body of the slider rack, (ii) the blade carriage extension arm to be positioned between the upper and lower lip of the slider rack, and (iii) for the slider rack and blade holder to serve as a stop block to each other. In some embodiments, the blade carriage extension arm and blade carriage holder are not offset, with the blade carriage extension arm extending directly from the end of the blade holder. One of ordinary skill in the art would appreciate that the blade carriage could be designed in a variety of configurations, and embodiments of the present invention are contemplated for use with any such configuration.

According to an embodiment of the present invention, the blade carriage includes a blade holder. In a preferred embodiment, the front face of the blade holder is formed with a depression adapted to receive a cutting blade, a plurality of blade holder cover attachment points, and a channel adapted to receive the blade retention pin. In the preferred embodiment the blade depression is defined by a rim or raised lip that borders all but one side of the blade depression. The blade depression is configured to receive the cutting blade in at least two different orientations, with a triangular bulge that is formed on the rim being adapted to define the possible orientations of the cutting blade. By receiving the blade in at least two orientations the utility knife can be used of both right and left handed users. In particular, the generally symmetrical shape of the utility knife enables ambidextrous use because the longitudinal axis of the slider knob of the blade trigger is aligned with the longitudinal axis of the housing shell. When the cutting blade is in a first orientation relative to the longitudinal axis of the utility knife, the sharpened edge of the cutting blade faces the first longitudinal side of the utility knife and is configured for use by a right-handed user. Conversely, when the cutting blade is in a second orientation relative to the longitudinal axis of the utility knife, the sharpened edge of the cutting blade faces the second longitudinal side of the utility knife and is configured for use by a left-handed user. At the open side of the blade depression is the channel that is adapted to receive the blade retention pin. In the preferred embodiment, the retention pin channel is configured to allow the blade retention pin to slide up and down within the channel and is also formed with a lock slot in the bottom of the channel that is adapted to receive a post extending from the rear side of the blade retention pin. Additionally, the retention pin channel is formed at a sufficient depth so that when the blade retention pin is in the channel the front surface of the blade retention pin is flush with the surface of the blade depression. In the preferred embodiment, the blade holder is also formed with a plurality of blade holder cover attachment points that are configured to engage with corresponding portions of the blade holder cover. One of ordinary skill in the art would appreciate that there are many suitable configurations for a blade holder, and embodiments of the present invention are contemplated for use with any such configuration.

In an alternate preferred embodiment of the blade carriage, the rear face of the blade holder is formed with a depression adapted to receive a cutting blade and the front face of the blade holder is formed a depression adapted to receive a blade release tab. In the preferred embodiment the blade depression is defined by a rim or raised lip that borders all but one side of the blade depression. In the alternate preferred embodiment, the blade holder may also be formed with one or more blade retention prongs around the edge of the blade depression that are configured to hold the cutting blade within the blade depression. The blade retention prongs, together with the blade depression, effectively form a blade holder slot, wherein the opening of the blade holder slot is at the front edge of the blade holder. The blade holder slot is configured to receive the cutting blade from the front edge of the blade holder, with the cutting blade sliding into the blade holder slot such that it held between the blade retention prongs and blade depression. In some embodiments, the cutting blade may be further secured within the blade depression by the blade release tab. In the preferred embodiment, the blade release tab is a flexible member retained by the blade holder that is configured to reversibly engage with a notch in the cutting blade.

According to an embodiment of the present invention, the retention pin channel includes a lock slot. In a preferred embodiment, the lock slot interrelates with the post on the blade retention pin to define the locked and unlocked positions of the blade retention pin. The lock slot is also formed with nodes that engage with the post in order to secure the blade retention pin place in position over a notch formed in the cutting blade. In the preferred embodiment, a hooked portion of the blade retention pin securely engages with the notch of the cutting blade when the blade retention pin is moved to the top or bottom of the lock slot. In either of the locked positions, a portion of the blade retention pin may extend below the blade carriage. When the retention pin is moved to the middle of the lock slot, the blade retention pin is disengaged from the cutting blade, allowing the cutting blade to be removed from the blade holder. In the preferred embodiment, the rear surface of the blade holder includes a blade orientation indicator that illustrates the possible orientations in which the cutting blade can be inserted into the blade holder. The rear surface of the blade holder also includes a lock indicator that shows whether the blade retention pin is in the locked or unlocked position, typically with the unlocked position being in the middle of the lock slot. In the preferred embodiment, the blade orientation indicator also indicates which way the retention pin should be moved in order to lock a cutting blade that has been inserted into the blade holder in one of the indicated orientations. As an illustrative example, the blade retention pin will be moved to the top of the lock slot when locking the cutting blade in one of the indicated orientations and moved to the bottom of the lock slot when locking the cutting blade in the other orientation.

According to an embodiment of the present invention, the blade carriage includes a blade retention pin. In a preferred embodiment, the blade retention pin is configured to secure the cutting blade in the blade holder and comprises a front side with an upper and lower hooked portion and a rear side with a post. In the preferred embodiment, the upper and lower hooked portions extend away from the surface of the front side of the retention pin and are configured to engage with a notch in the cutting blade in order to secure the cutting blade in the blade holder. The blade retention pin is configured to receive the cutting blade between the hooked portions when the notch on the cutting blade is aligned between the hooked portions of the blade retention pin. In particular, with the blade retention pin in the unlocked position, the cutting blade can be inserted into the blade holder because the front surface of the blade retention pin is flush with the surface of the depression of the blade holder. Once the cutting blade is positioned in the depression of the blade holder, the blade retention pin can be moved into a locked position causing one of the hooked portions of the blade retention pin to engage with the notch of the cutting blade. In the preferred embodiment, the blade retention pin further comprises a post extending from the rear of the blade retention pin that engages with lock slot of the retention pin channel. One of ordinary skill in the art would appreciate that there are many suitable designs for a blade retention pin, and embodiments of the present invention are contemplated for use with any such design.

According to an embodiment of the present invention, the blade carriage includes a blade carriage extension arm. In a preferred embodiment, the blade carriage extension arm is configured to engage with, directly or indirectly, the blade trigger assembly and is guided by the blade carriage track. To facilitate the connection with the blade trigger assembly, the blade carriage extension arm may be formed with a linear gear, a hole to engage with a blade carriage engagement post, one or more flanges formed to fit around a blade carriage extension post, or any combination thereof. In a first preferred embodiment, the blade carriage is indirectly engaged with the blade trigger assembly via the pinion gear. In particular, a linear gear formed on top of the blade carriage extension arm indirectly engages with a linear gear on the upper lip of the slider rack via a pinion gear positioned between those components, thereby allowing movement of one of those components to be transferred to the other. The linear gear of the blade carriage extension arm aligns with the linear gear of the slider rack due to the offset between the blade holder and blade carriage extension arm. In a second preferred embodiment, the blade carriage is directly connected to the blade trigger, thereby enabling movement of the blade trigger assembly to be directly transferred to the blade carriage assembly. Specifically, a carriage engagement post formed on the blade trigger either (i) directly connects to a hole formed in the blade carriage extension arm or (ii) is fitted between one or more flanges formed on the blade carriage extension arm.

According to an embodiment of the present invention, the blade carriage extension arm is configured with a carriage post slot. In a preferred embodiment, the carriage post slot is an opening formed in the blade carriage extension arm that allows the blade carriage post to pass through the blade carriage extension arm. By passing through the blade carriage, the blade carriage post can guide and limit the movement of the blade carriage, while also providing an attachment point for the washer that secures the blade carriage to the housing shell without completely immobilizing the blade carriage. The carriage post slot may be configured in any suitable width to accommodate the blade carriage post and of any suitable length to facilitate the sliding motion of the blade carriage. In some embodiments, the blade carriage extension arm also includes at least one tension component attachment point. In some embodiments, blade carriage extension arm includes a pair of parallel rails on the rear side of the blade carriage extension arm. In a preferred embodiment, the parallel rails are adapted to guide the blade carriage extension arm relative to both the blade carriage post and portions of the blade carriage track. In some embodiments, the parallel rails also partially retain the tension component attached to the blade carriage. In some embodiments, the blade carriage extension arm also includes a pinion gear retention flange extending perpendicularly from the top, front edge of the blade carriage extension arm. In the preferred embodiment, the pinion gear retention flange flanks, and is coextensive with, the linear gear of the blade carriage extension arm and is adapted to prevent the pinion gear from sliding off the pinion gear post.

According to an embodiment of the present invention, the blade carriage extension arm of the blade carriage is configured with a squeeze lever ramp. In a preferred embodiment, the squeeze lever ramp is an angled portion of the blade carriage extension arm that is configured to slidably engage with the squeeze lever, so that movement of the squeeze lever can be transferred to the blade carriage. In the preferred embodiment, the squeeze lever ramp slidably engages with the lever ramp pivot point of the squeeze lever. In some embodiments a bolt or similar connector passes through the squeeze lever at the lever ramp pivot point to further facilitate the sliding motion of the blade carriage relative to the squeeze lever. [0086] According to an embodiment of the present invention, the blade carriage assembly includes a blade holder cover. In a preferred embodiment, the blade holder cover is attached to the blade holder and covers both the depression for the cutting blade, as well as the retention pin channel. In the preferred embodiment, the blade holder cover is configured with clip arms that are adapted to engage with the blade holder cover attachment points on the blade holder, thereby forming an opening through which the cutting blade projects. In some embodiments, the blade holder cover is detachable from the blade holder, while in other embodiments it is permanently fixed to the blade holder. In the preferred embodiment, the blade holder cover engages with the blade holder such that an opening is maintained at the top and bottom of the retention pin channel, thereby enabling the retention pin to slide between an upper locked position and a lower lock position. In either of the locked positions, a portion of the blade retention pin may extend beyond the edge of the blade carriage.

According to an embodiment of the present invention, the blade actuation mechanism includes a pinion gear. In a preferred embodiment, the pinion gear is a toothed wheel with a hole that is configured to engage with and rotate on the pinion gear post. In the preferred embodiment, the pinion gear engages with the pinion gear post via a hole formed in the center of the pinion gear. The cogs of the pinion gear are configured to engage between the linear gear portions of the slider rack and blade carriage. In particular, the pinion gear allows for movement of the blade trigger assembly to be indirectly transferred to the blade carriage assembly through a rack-and-pinion relationship between the components. Furthermore, the pinion gear enables a blade actuation mechanism in which movement of the blade trigger assembly in one direction causes movement of the blade carriage assembly in the opposite direction. One of ordinary skill in the art would appreciate that there many suitable configurations for a pinion gear, and embodiments of the present invention are contemplated for use with any such pinion gear.

According to an embodiment of the present invention, the blade actuation mechanism includes one or more tension components. In a preferred embodiment, the tension components are springs or other biasing mechanisms that are configured to urge components of the blade actuation mechanism in a particular direction. In particular, the tension components are adapted to cause or assist with the retraction of the cutting blade, by biasing components of the blade actuation mechanism to a retracted position. In the preferred embodiment, the tension components may be partially retained in recesses or groves formed on the inner surface of the housing shell. Examples of suitable tension components include, but are not limited to, springs, elastic bands, and similar pliant components. In the preferred embodiment, a tension component may be attached between a tension component attachment point on the housing shell and a tension component attachment point on a component of the blade actuation mechanism. In some embodiments, a first tension component attaches between the housing shell and the blade trigger assembly, while a second tension component attaches between the housing shell and the blade carriage assembly. In some embodiments, however, there is only one tension component, with the tension component connecting between the housing shell and either the blade carriage assembly or the blade trigger assembly. One of ordinary skill in art would appreciate that there are numerous types and configurations for a tension component, and embodiments of the present invention are contemplated for use with any such tension component.

According to an embodiment of the present invention, the utility knife may be configured with one or more tension component attachment points that may be formed on the inner surface of the housing shell, as well as components of the blade actuation mechanism. In a preferred embodiment, each tension component attachment point (or anchor point) is a peg, hook, or hole that is adapted to receive or connect to a tension component. One of ordinary skill in the art would appreciate that there are many arrangements for tension component attachment points, and embodiments of the present invention are contemplated for use with any such arrangement.

According to an embodiment of the present invention, the utility knife includes one or more weights. In a preferred embodiment, the one or more weights are retained within various cavities formed on the inside of the housing shell and may be secured in place via a friction fit, an adhesive, or any combination thereof. In a preferred embodiment, the one or more weights provide a means of balancing the utility knife in the hand of a user so as to maximize the ergonomics of the utility knife. Furthermore, a balanced utility knife is easier to control and therefore safer to use than an unbalanced utility knife. In the preferred, the one or more weights may be positioned at the opposite end of the utility knife from the cutting blade. This arrangement allows the weights to balance out the relatively heavier components of the cutting blade and blade carriage assembly that are located at the front of the utility knife. One of ordinary skill in the art would appreciate that there are numerous uses for a weight in a utility knife, and embodiments of the present invention are contemplated to take advantage of any such use.

According to an embodiment of the present invention, the utility knife may include a cutting blade. In a preferred embodiment, the cutting blade may be removably engaged with the blade holder of the blade carriage. The cutting blade may be made from any suitable material, including, but not limited to, metal, ceramic, or any combination thereof. In the preferred embodiment, the cutting blade is made from a ceramic material that is capable of withstanding extended use without becoming dull or unusable. Ceramic materials appropriate for such construction include, but are not limited to, zirconium oxide. In the preferred embodiment, the cutting blade is configured with a notch that is adapted to engage with either (i) a hooked portion of the blade retention pin or (ii) the blade release tab of the blade holder. One of ordinary skill in the art would appreciate that there are numerous configurations and materials that might be used for the cutting blade, and embodiments of the present invention are contemplated for use with any such material or configuration.

According to an embodiment of the present invention, the utility knife has an automatically retracting cutting blade. In a preferred embodiment, the cutting blade of the utility knife is extended by actuating the blade trigger by either (i) moving the slider knob of the blade trigger toward the front of the utility knife (ii) moving the slider knob of the blade trigger toward the rear of the utility knife or (iii) moving the squeeze lever of the blade trigger into the housing shell of the utility knife. Movement of the blade trigger causes the one or more tension components to be stretched from its neutral state, thereby applying pressure to the blade carriage that will cause the cutting blade to be retracted. In the preferred embodiment, the cutting blade is automatically retracted when the cutting blade is lifted off of the cutting surface, regardless of whether the user has released the blade trigger. In an alternate embodiment, the cutting blade is automatically retracted when the user releases the blade trigger. One of ordinary skill in the art would appreciate that there are many methods to creating an automatically retracting blade, and embodiments of the present invention are contemplated for use with any such method.

According to an embodiment of the present invention, the cutting blade of the utility knife is extended by moving the slider knob of the blade trigger toward the front of the utility knife. In a preferred embodiment, moving the slider knob of the blade trigger toward the front of the utility knife will extend the cutting blade when there is a direct connection between the blade trigger assembly and the blade carriage assembly of the blade actuation mechanism. In particular, there is a direct movement relationship between the blade trigger assembly and the blade carriage assembly, wherein the blade trigger assembly and the blade carriage assembly move in unison and in the same direction. When a user moves the slider knob of the blade trigger towards the front of the utility knife, the blade carriage is also moved towards the front of the utility knife, extending the cutting blade through the blade outlet slot. In the preferred embodiment, the cutting blade automatically retracts when the user releases the blade trigger.

According to an embodiment of the present invention, the cutting blade of the utility knife is extended by moving the slider knob of the blade trigger toward the rear of the utility knife. In a preferred embodiment, moving the slider knob of the blade trigger toward the rear of the utility knife will extend the cutting blade when there is an indirect connection between the blade trigger assembly and blade carriage assembly of the blade actuation mechanism that is facilitated by a rack-and-pinion arrangement of those components. In particular, there is an indirect movement relationship between the blade trigger assembly and the blade carriage assembly, wherein the blade trigger assembly and the blade carriage assembly move in opposite directions to cause the extension of the cutting blade. When a user moves the slider knob of the blade trigger towards the rear of the utility knife, the movement of the blade trigger assembly is transferred to the blade carriage assembly via a pinion gear. The pinion gear facilitates a rack-and-pinion relationship between the blade trigger assembly and the blade carriage assembly such that the rearward movement of the blade trigger assembly causes forward movement of the blade carriage assembly, thereby causing extension of the cutting blade through the blade outlet slot. In a first preferred embodiment, the rack-and-pinion relationship enables the cutting blade to be automatically retracted when the cutting blade is lifted off the cutting surface, regardless of whether the slider knob of the blade trigger has been released. In a second preferred embodiment, the cutting blade will automatically retract only after the user releases the slider knob of the blade trigger.

According to an embodiment of the present invention, the cutting blade of the utility knife is extended by squeezing the squeeze lever of the blade trigger into the housing shell of the utility knife, thereby enabling a perpendicular movement relationship between the blade trigger assembly and the blade carriage assembly, wherein the vertical motion of the squeeze lever is converted into the horizontal motion of the blade carriage. In a preferred embodiment, squeezing the squeeze lever of the blade trigger into the housing shell of the utility knife will extend the cutting blade when there is a direct connection between the blade trigger assembly and the blade carriage assembly of the blade actuation mechanism. When a user squeezes the squeeze lever of the blade trigger into the housing shell of the utility knife, the squeeze lever presses against the blade carriage, thereby causing the blade carriage to move towards the front of the utility knife and extending the cutting blade through the blade outlet slot. In the preferred embodiment, the cutting blade automatically retracts when the user releases the squeeze lever.

In an alternate preferred embodiment, squeezing the squeeze lever of the blade trigger into the housing shell of the utility knife will extend the cutting blade when there is an indirect connection between the blade trigger assembly and blade carriage assembly of the blade actuation mechanism that is facilitated by a rack-and-pinion arrangement of those components. When a user squeezes the squeeze lever of the blade trigger into the housing shell of the utility knife, the motion of the squeeze lever is transferred to the trigger slide and further to the slider rack, thereby enabling the collective movements of the components of the blade trigger assembly to be transferred to the blade carriage assembly via a pinion gear. The pinion gear facilitates a rack-and-pinion relationship between the blade trigger assembly and the blade carriage assembly such that the vertical motion of the squeeze lever is transferred into rearward horizontal motion of the trigger slide and slider rack, which further causes forward horizontal motion of the blade carriage assembly and the extension of the cutting blade through the blade outlet slot. In a first preferred embodiment, the rack-and-pinion relationship enables the cutting blade to be automatically retracted when the cutting blade is lifted off the cutting surface, regardless of whether the squeeze lever of the blade trigger has been released. In a second preferred embodiment, the cutting blade will automatically retract only after the user releases the squeeze lever of the blade trigger.

According to an embodiment of the present invention, the blade trigger assembly and the blade carriage assembly of the blade actuation mechanism have a rack-and-pinion relationship facilitated by a pinion gear. In a preferred embodiment, when the cutting blade is retracted, the blade trigger assembly is also in the retracted position, which may is characterized by (i) the slider knob of the blade trigger being at the forward position of the blade trigger channel or (ii) the squeeze lever of the blade trigger being in an extended position outside of the housing shell. In the retracted position, the slider pin on the trigger slide is engaged with the lever arm of the slider rack, allowing movement of the blade trigger to be directly transferred to the slider rack. When the slider knob of the blade trigger is moved toward the rearward position of the blade trigger channel or (ii) the squeeze lever of the blade trigger is squeezed to be inside of the housing shell, the trigger slide and the slider rack are moved toward the rear of the utility knife, thereby causing the blade carriage assembly to move toward the front of the utility knife and the cutting blade to be extended through the blade outlet slot. In the preferred embodiment, the pinion gear transfers and converts rearward movement of the slider rack into forward movement of the blade carriage. Depending upon the particular arrangement of components, the cutting blade will may be automatically retracted when the cutting blade is lifted off of the cutting surface or when the user releases the blade trigger.

According to an embodiment of the present invention, a blade actuation mechanism with a rack-and-pinion relationship between the blade trigger assembly and the blade carriage assembly is configured to automatically retract the cutting blade when the cutting blade is lifted from the cutting surface. In a preferred embodiment, the rearward movement of the trigger slide of the blade trigger assembly causes the ribs on the front of the plate portion of the slider pin to interact with the slider pin grooves in the housing shell. The interaction between the ribbing on the slider pin and the grooves in the housing shell causes the entire slider pin to move from its resting position within the slider pin recess of the trigger slide. This movement of the slider pin causes the slider pin to flex the lever arm of the slider rack as (i) the slider knob of the blade trigger is move rearward or (ii) the squeeze lever of the blade trigger is squeezed to the inside of the housing shell. As the cutting blade is pulled along the cutting surface, the blade carriage is pulled slightly forward, which in turn causes the slider rack to move slightly rearward due to the rack-and-pinion relationship between those components. As the slider rack moves slightly rearward, the lever arm of the slider rack disengages from the slider pin in the trigger slide as the flex in the lever arm causes it to return to is relaxed position. With the lever arm disengaged from the slider pin, the slider rack and trigger slide are no longer connected and are able to move independently. Therefore, when the cutting blade is removed from the cutting surface, the blade carriage assembly is automatically retracted toward the rear of the utility knife by a tension component because the slider rack has been disconnected from the trigger slide and there is no linkage to hold the cutting blade in the extended position. Furthermore, as the blade carriage moves toward the rear of the utility knife to retract cutting blade through the blade outlet slot, the rack-and-pinion arrangement causes the slider rack to move toward the front of the utility knife independently of the trigger slide. When the user releases the slider knob or squeeze lever, a separate tension component attached to the blade trigger causes either (i) the slider knob of the blade trigger to return to the retracted position in the forward portion of the blade trigger channel or (ii) the trigger slide of the blade trigger to move toward the front end of the utility knife, which in turn causes the squeeze lever of the blade trigger to return to an extended position outside of the housing shell. As the blade trigger and the trigger slide thereof return to the retracted position, the ribbing on the slider pin and the grooves in the housing shell cause the slider pin to move back to its starting position within the slider pin recess, thereby causing the slider pin to reengages with the lever arm of the slider rack, which causes the trigger slide to reconnect with the slider rack. Overall, this configuration provides a utility knife that automatically retracts the cutting blade, whether or not the user releases the blade trigger, which increases the safety of the utility knife. Additionally, this configuration enables a cutting blade extension motion that is in the same direction as the cutting motion, which reduces hand fatigue.

According to an embodiment of the present invention, a blade actuation mechanism with a rack-and-pinion relationship between the blade trigger assembly and the blade carriage assembly is configured to automatically retract the cutting blade only after the user releases the blade trigger. In contrast to the embodiment of the previously described blade actuation mechanism that automatically retracts the cutting blade when the cutting blade is lifted from the cutting surface, this alternate embodiment of a rack-and-pinion blade actuation mechanism does not cause the slider rack to disengage from the blade trigger as the cutting blade is pulled along the cutting surface. Therefore, the slider rack and trigger slide cannot move independently and the cutting blade and blade carriage will not be retracted until the blade trigger is released. In particular, because the slider rack does not disconnect from the trigger slide, a linkage remains that holds the blade carriage in the extended position. When the blade trigger is released, one or more tension components cause the blade actuation mechanism to return to the retracted position. Generally, as the slider knob of the blade trigger is moved toward the forward position of the slider button channel, the slider rack is moved toward the front of the utility knife, thereby causing the blade carriage assembly to move toward the rear of the utility knife, retracting the cutting blade back through the blade outlet slot. Overall, this configuration enables a cutting blade extension motion that is in the same direction as the cutting motion, which reduces hand fatigue.

According to an embodiment of the present invention, the utility knife has a manually retracting blade. In a preferred embodiment, the cutting blade of the utility knife can be extended by pushing the slider knob of the blade trigger forward in the blade trigger channel or retracted by pulling the slider knob of the blade trigger to the rear of the blade trigger channel. In the preferred embodiment, the blade actuation mechanism of a manually retractable utility knife primarily comprises a carriage engagement post formed on the trigger slide of the blade trigger that engages with a hole formed in the blade carriage extension arm, thereby allowing movement of the blade trigger to be transferred directly to the blade carriage. In some embodiments, the cutting blade can be incrementally extended to cut through materials of varying thicknesses. Accordingly, the blade trigger may be configured to extend and lock at multiple positions that correspond to the varying extension of the blade (e.g. a first position where the blade is totally retracted, a second position where the blade is partially extended, and a third position where the blade is totally extended). To extend or retract the blade, the blade trigger could be depressed and moved to the appropriate position. Once the blade is extended or retracted to the appropriate position, the blade trigger could then be released and the blade would be locked into that position. In the preferred embodiment, locking tabs formed on a lock lever on the rear of the blade trigger reversibly engage with locking points formed on the inner surface of the blade trigger channel. In some embodiments, the blade actuation mechanism of a manually retractable utility knife includes a tension component to assist with the retraction of the blade carriage and cutting blade when the blade trigger disengages from the locking points.

Turning now to FIG. 1, a front, left-side perspective view of a utility knife with a rack-and-pinion blade actuation mechanism, in accordance with an embodiment of the present invention. In a preferred embodiment, the utility knife 100 primarily comprises a housing shell 102 configured to internally retain a blade actuation mechanism. In the preferred embodiment, the blade actuation mechanism features a blade trigger assembly and blade carriage assembly that have a rack-and-pinion relationship. The rack-and-pinion blade actuation mechanism enables a user to extend the cutting blade 101 through the blade outlet slot 103 at the front edge of the utility knife 100 by sliding the slider knob of the blade trigger 126 of the blade trigger assembly towards the rear of the blade trigger channel 108 formed at the front portion of the utility knife 100.

Figure 2A:
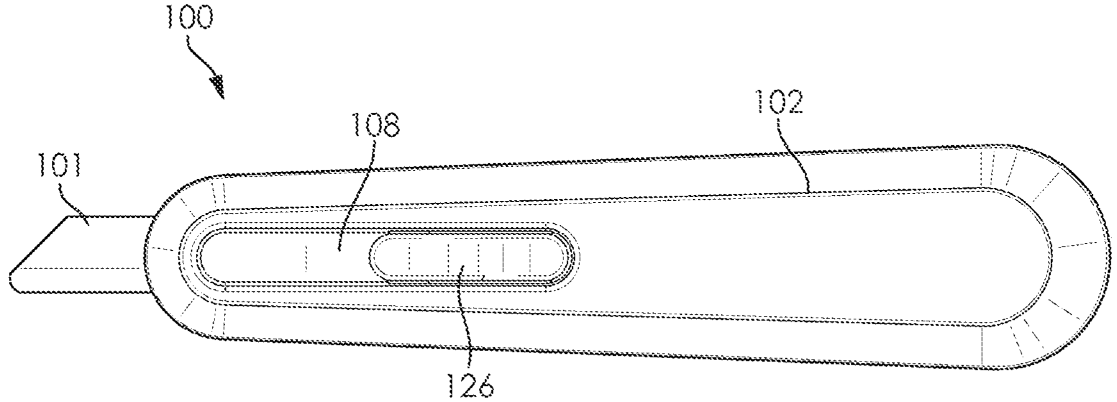
FIGS. 2A and 2B are left-side views of a utility knife in accordance with a first embodiment of the present invention utilizing a slider knob blade trigger.
Figure 2B:
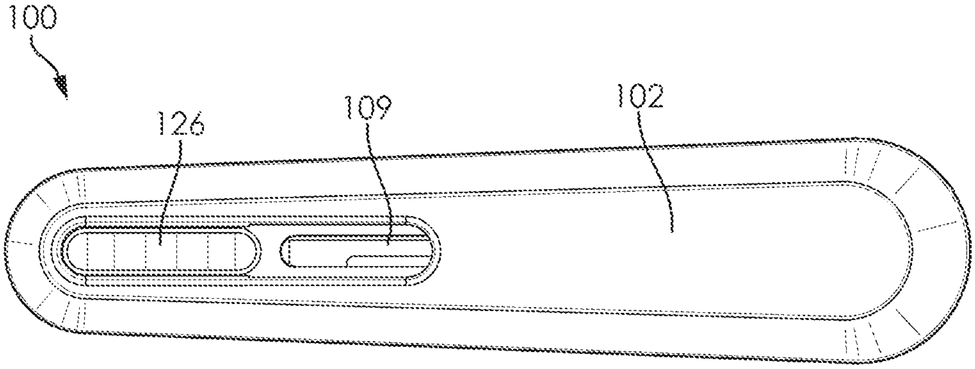

Turning now to FIGS. 2A and 2B, left-side views of a utility knife with a rack-and-pinion blade actuation mechanism, in accordance with an embodiment of the present invention. As shown in FIG. 2A, the rack-and-pinion blade actuation mechanism enables a user to extend the cutting blade 101 by sliding the slider knob of the blade trigger 126 of the blade trigger assembly towards the rear of the blade trigger channel 108 that is formed on the front of the housing shell 102. As shown in FIG. 2B, the cutting blade is retracted when the slider knob of the blade trigger 126 is to the forward position. Additionally, FIG. 2B, illustrates that the slider knob of the blade trigger 126 of the blade trigger assembly passes through a blade trigger opening 109 that is formed in the blade trigger channel 108.

Figure 3A:
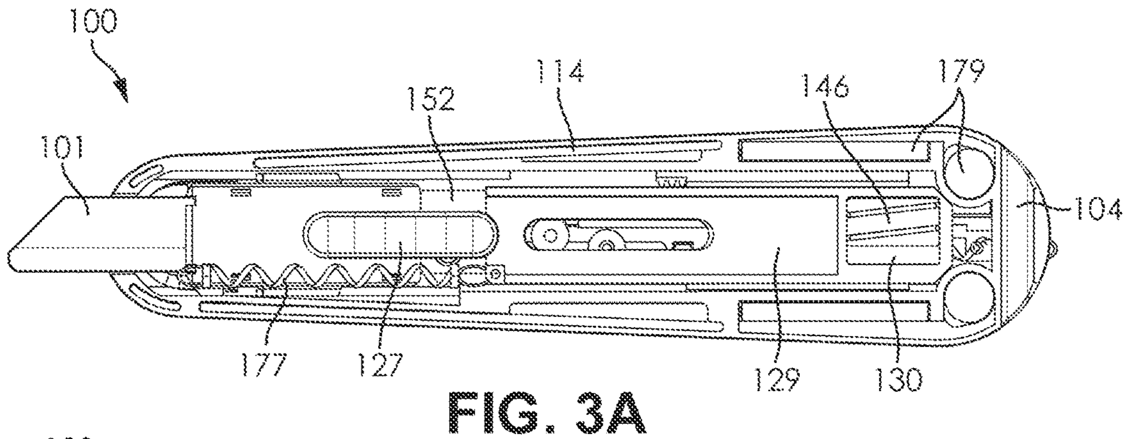
FIGS. 3A and 3B are left-side and right-side internal views of a utility knife with the cutting blade in an extended position in accordance with a first embodiment of the present invention utilizing a slider knob blade trigger.
Figure 3B:
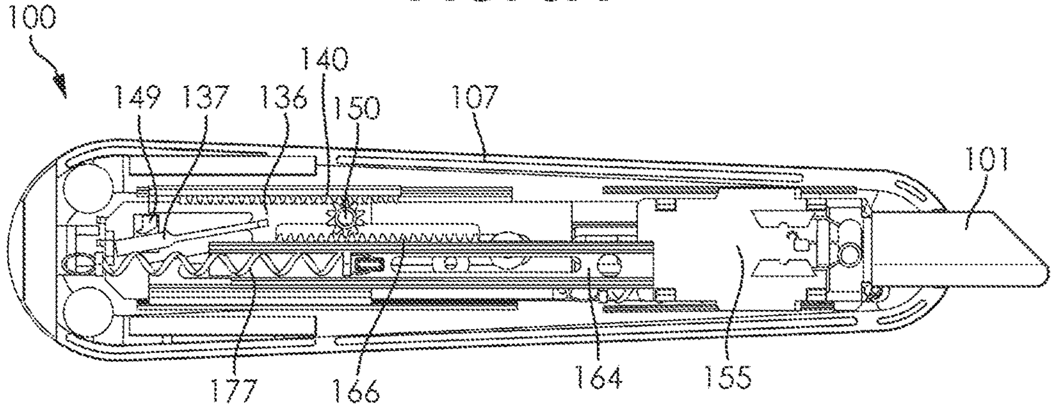

Turning now to FIGS. 3A and 3B, left-side and right-side internal views of a utility knife with a rack-and-pinion blade actuation mechanism and a cutting blade in the extended position, in accordance with an embodiment of the present invention. In a preferred embodiment, the cutting blade 101 is extended when the blade carriage assembly 152 is moved forward as the blade trigger assembly is moved to the rearward position. In the preferred embodiment, the rearward movement of the slider knob 127, trigger slide 129, and slider rack are transferred to the blade carriage assembly 152 via a pinion gear 150. In particular, as the blade trigger assembly is moved toward the rear of the utility knife 101, a hooked portion 149 of the rack lever latching post of the slider pin 146 engages with a corresponding hooked portion of the lever arm 137 extending from the main body 136 of the slider rack thereby causing the slider rack to be moved toward the rear of the utility knife 100 when the slider knob 127 and trigger slide 129 moved in that direction. As the slider rack is moved towards the rear of the utility knife, a linear gear 140 on the slider rack causes rotation of a pinion gear 150, which is in turn transferred to a linear gear 166 formed on the blade carriage extension arm 164. As a result, the rearward movement of the blade trigger assembly causes the forward movement of the blade carriage assembly 152 so that the cutting blade 101 within the blade holder 155 can be extended. Furthermore, as the blade trigger assembly is moved towards the rear of the utility knife 100, the interaction between the grooves on the slider pin 146 and the corresponding slider pin groves 112 on the left-half housing shell 107 causes the slider pin 146 to move up within the slider pin recess 130, which in turn causes the slider pin 146 to flex the lever arm 137 of the slider rack. As the cutting blade 101 is pulled along the cutting surface, the blade carriage assembly 152 moves slightly forward, which in turn causes the slider rack to move slightly rearward due to the rack-and-pinion relationship between those components. When slider rack moves slightly rearward, the lever arm 137 of the slider rack disengages from the slider pin 146 in the trigger slide as the flex in the lever arm causes it to return to is relaxed position. With the lever arm 137 disengaged from the slider pin 146, the slider rack and blade carriage become disconnected from the trigger slide 129, thereby allowing the tension components 177 to respectively (i) return the blade carriage assembly 152 to the retracted position when the cutting blade 101 is removed from the cutting surface and (ii) the blade trigger assembly to the forward position when the blade trigger knob 127 is released.

Figure 4A:
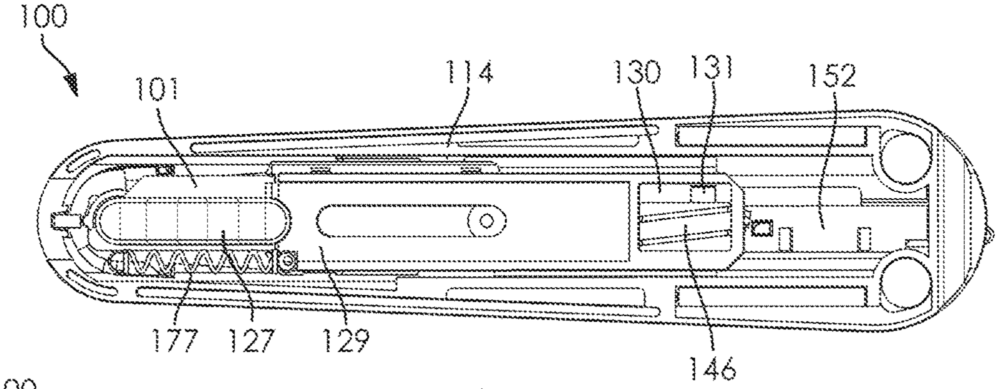
FIGS. 4A and 4B are left-side and right-side internal views of a utility knife with the cutting blade in retracted position in accordance with a first embodiment of the present invention utilizing a slider knob blade trigger.
Figure 4B:
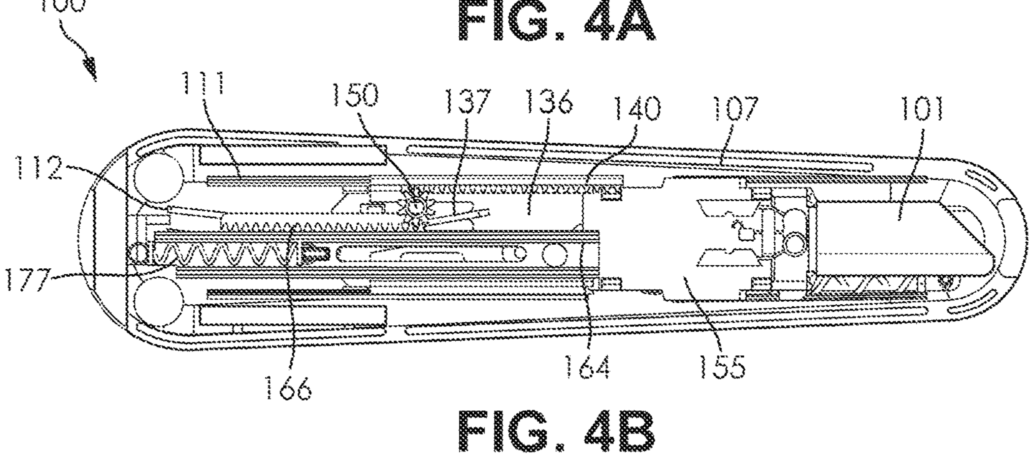

Turning now to FIGS. 4A and 4B, left-side and right-side internal views of a utility knife with a rack-and-pinion blade actuation mechanism and a cutting blade in the retracted position, in accordance with an embodiment of the present invention. In a preferred embodiment, the cutting blade 101 is retracted when the blade carriage assembly 152 is in the rear position and the blade trigger is in the front position. When the cutting blade 101 is removed from the cutting surface, the blade carriage assembly 152 is automatically retracted toward the rear of the utility knife 100 by a tension component 177 because the lever arm 137 of the slider rack has been disconnected from the trigger slide 129 and there is no linkage to hold the cutting blade 101 in the extended position. Furthermore, as the blade carriage 152 is being retracted toward the rear of the utility knife 100 to retract cutting blade 101, the linear gear 166 on the blade carriage extension arm 164 causes rotation of a pinion gear 150, which is in turn transferred to the linear gear 140 formed on the slider rack, thereby causing the slider rack to move toward the front of the utility knife independently of the blade trigger. When the blade trigger is released, a separate tension component 177 attached to the front of the trigger slide 129 causes the blade trigger to return to the retracted position in the forward portion of the blade trigger channel. As the blade trigger returns to the retracted position, the ribbing 146 on the slider pin and the slider pin grooves 112 in the housing shell 107 cause the slider pin to move back to its starting position within the slider pin recess 130 and to reengage with the lever arm 137 of the slider rack.

Figure 5A:
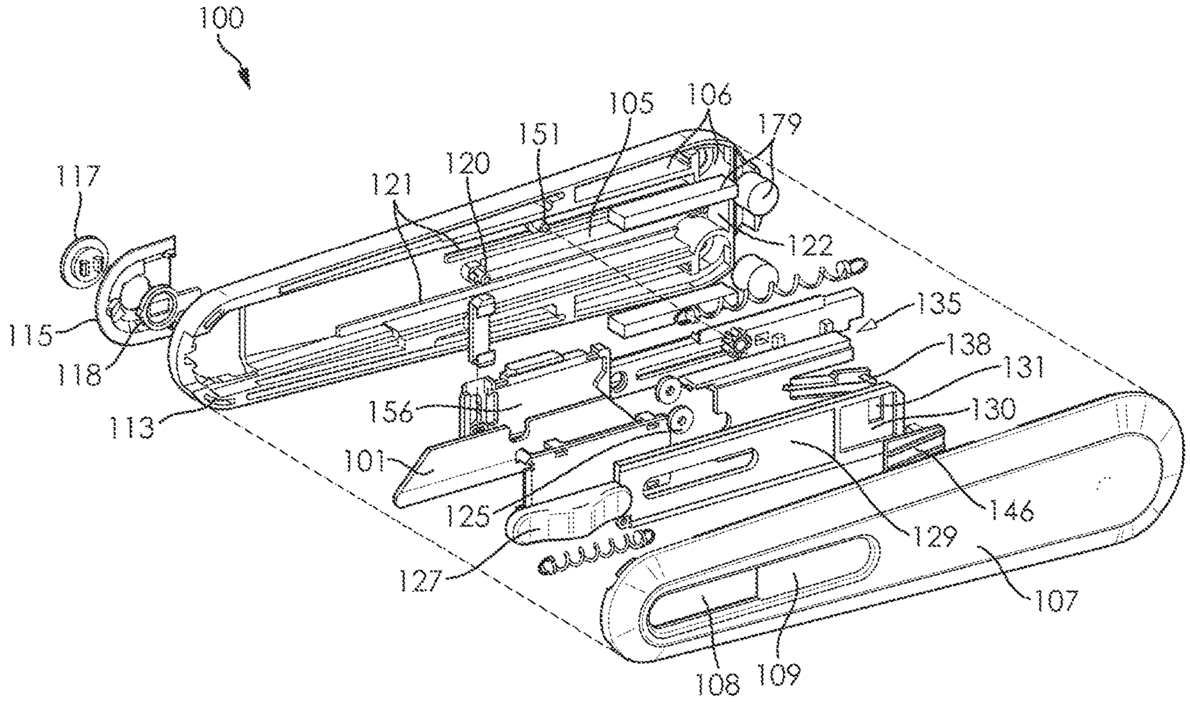
FIGS. 5A and 5B are front, left-side and front, right-side exploded perspective views of a utility knife in accordance with a first embodiment of the present invention utilizing a slider knob blade trigger.
Figure 5B:
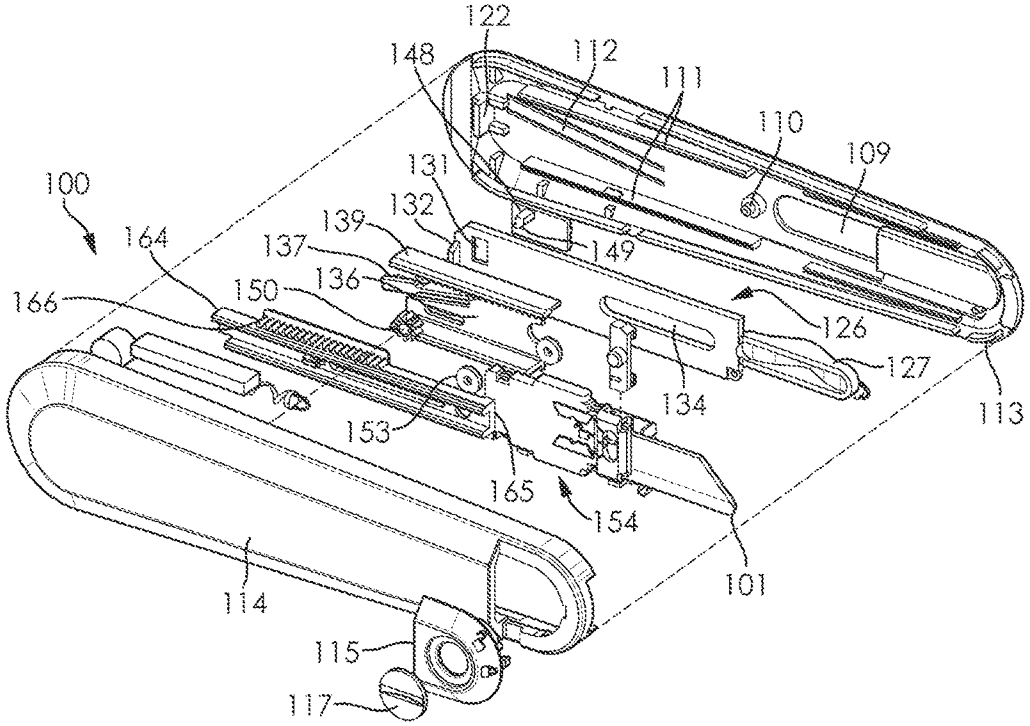

Turning now to FIGS. 5A and 5B, front, left-side and front, right-side exploded perspective views of a utility knife with a rack-and-pinion blade actuation mechanism, in accordance with an embodiment of the present invention. In a preferred embodiment, the utility knife 100 primarily comprises a housing shell and a blade actuation mechanism. In the preferred embodiment, the housing shell comprises a left-half 107 and right-half 114 that are configured to retain the blade actuation mechanism. The blade trigger channel 108 and blade trigger opening 109 are formed on the exterior surface of the left-half housing shell 107. The interior surface of the left-half housing shell 107 includes the blade trigger post 110, the blade trigger track 111, the slider pin grooves 112, the front housing engagement means 113, and the rear housing engagement means 122. A blade access panel 115 on the right-half housing shell 114, provides access to the cutting blade 101. The blade access panel 115 primarily comprises an access panel lock formed from an outer slotted disk 117 and an inner latching component 118. The interior surface of the right-half housing shell 114 includes a groove 105 for the tension component, recesses 106 for the weights 179, the front housing engagement means 113, the blade carriage post 120, the blade carriage track 121, the rear housing engagement means 122, and pinion gear post 151. In the preferred embodiment, the blade actuation mechanism primarily comprises a blade trigger assembly, a blade carriage assembly, and a pinion gear 150. The blade trigger assembly comprises the blade trigger washer 125, the blade trigger 126, the slider rack 135, and the slider pin 146. The blade trigger 126 comprises the slider knob 127 and the trigger slide 129, which is formed with the slider pin recess 130, a slider rack engagement flange 132, and the slider post slot 134. The slider rack 135 comprises a main body portion 136 formed with a lever arm 137 with a catch portion 138, and an upper lip 139 with a linear gear. The catch portion 138 of the lever arm 137 engages with hooked portion 149 of the rack lever latching post 148. The slider pin 146 comprises a ribbed front plate portion and a rack lever latching post 148 with a hooked portion 149. The rack lever latching post 148 passes through a hole 131 in the blade trigger recess 130 of the trigger slide 129 and engages with the lever arm 137 of the slider rack 135. The blade carriage assembly comprises the blade carriage washer 153, the blade carriage 154, the blade holder cover, and the blade retention pin. The blade carriage 154 comprises the blade holder and the blade carriage extension arm 164. The blade holder is formed with a depression 156 configured to retain the cutting blade 101. The blade carriage extension arm 164 has an offset 165 from the blade holder and is formed with a linear gear 166.

Figure 6:
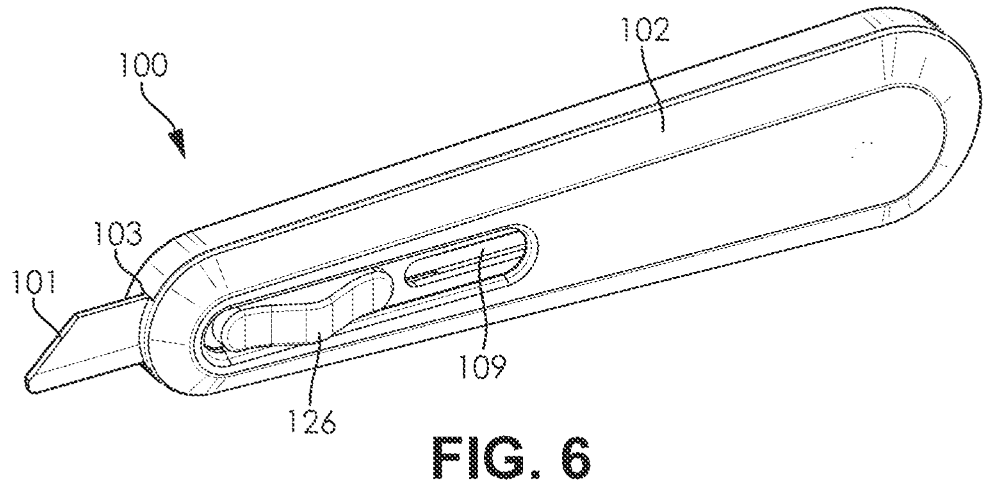
FIG. 6 is a front, left-side perspective view of a utility knife in accordance with a second embodiment of the present invention utilizing a slider knob blade trigger.

Turning now to FIG. 6, a front, left-side perspective view of an automatically retractable utility knife with a direct connection between the blade trigger assembly and the blade carriage assembly, in accordance with an embodiment of the present invention. In some embodiments, the utility knife 100 primarily comprises a housing shell 102 configured to internally retain a blade actuation mechanism. In some embodiments, the blade actuation mechanism features a blade trigger assembly and blade carriage assembly that are directly connected. The direct connection between the blade trigger assembly and the blade carriage assembly enables a user to extend the cutting blade 101 through the blade outlet slot 103 at the front edge of the utility knife 100 by sliding the blade trigger 126 of the blade trigger assembly towards the front of the blade trigger channel 108 formed at the front portion of the utility knife 100.

Figure 7A:
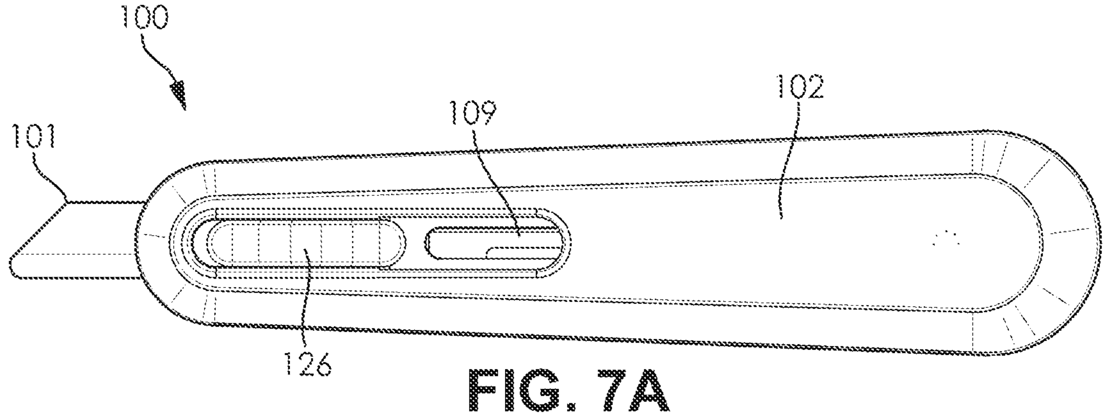
FIGS. 7A and 7B are left-side views of a utility knife in accordance with a second embodiment of the present invention utilizing a slider knob blade trigger.
Figure 7B:
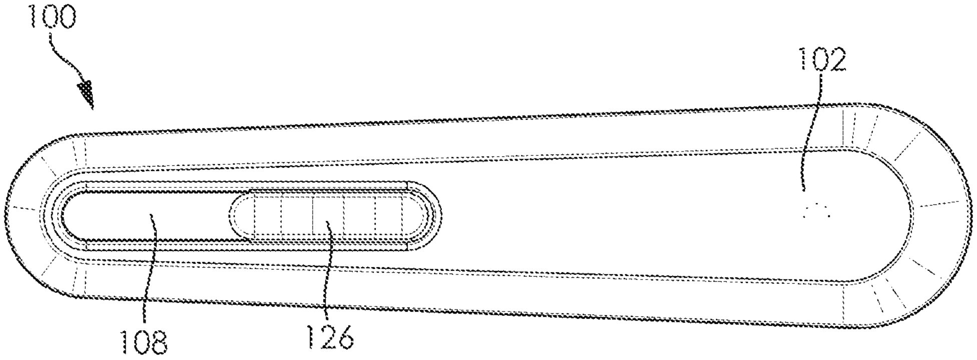

Turning now to FIGS. 7A and 7B, left-side views of an automatically retractable utility knife with a direct connection between the blade trigger assembly and the blade carriage assembly, in accordance with an embodiment of the present invention. As shown in FIG. 7A, the direct connection between the blade trigger assembly and the blade carriage assembly enables a user to extend the cutting blade 101 by sliding the blade trigger 126 of the blade trigger assembly towards the front of the blade trigger channel 108 that is formed in the front of the housing shell 102. As shown in FIG. 7B, the cutting blade is retracted when the blade trigger 126 is in the rearward position. Additionally, FIG. 7A, illustrates that the blade trigger 126 of the blade trigger assembly passes through a blade trigger opening 109 that is formed in the blade trigger channel 108.

Figure 8A:
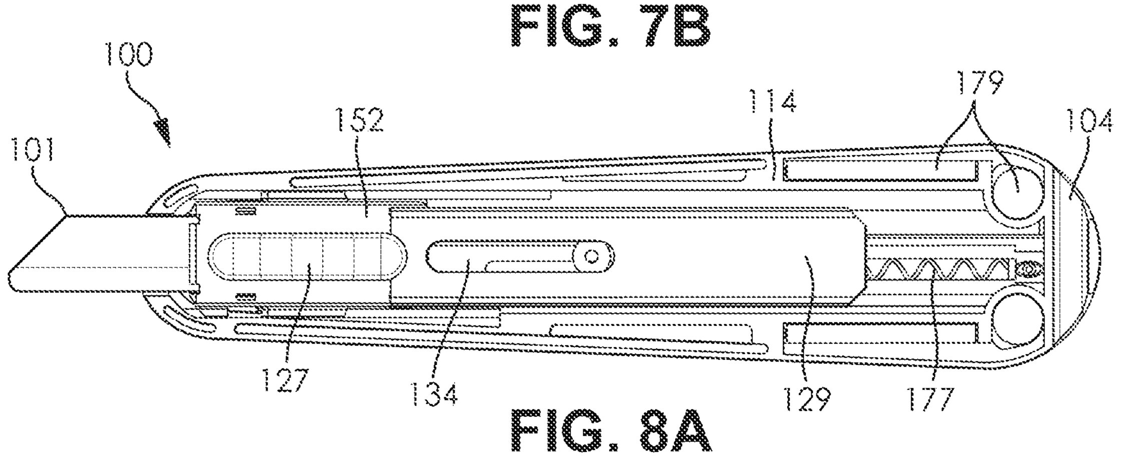
FIGS. 8A and 8B are left-side and right-side internal views of a utility knife with the cutting blade in an extended position in accordance with a second embodiment of the present invention utilizing a slider knob blade trigger.
Figure 8B:
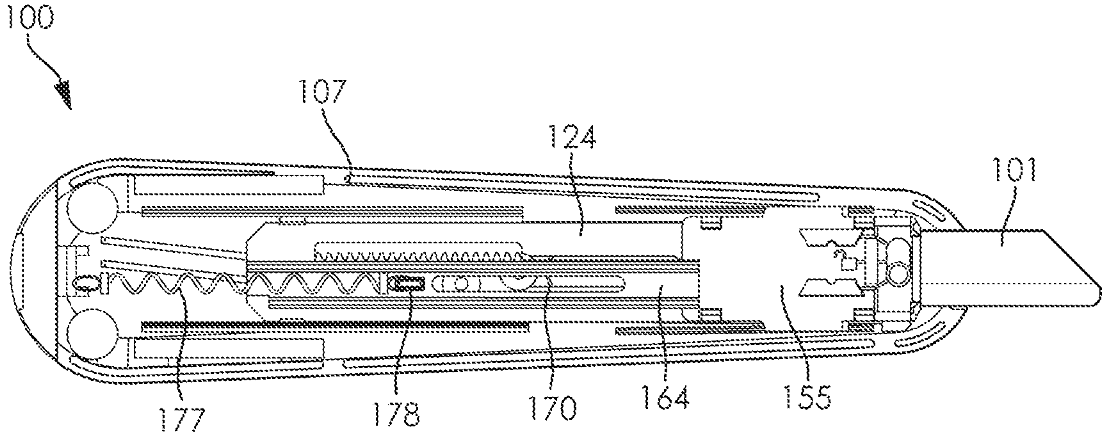

Turning now to FIGS. 8A and 8B, left-side and right-side internal views of an automatically retractable utility knife with a direct connection between the blade trigger assembly and the blade carriage assembly and a cutting blade in the extended position, in accordance with an embodiment of the present invention. In some embodiments, the cutting blade 101 is extended when the blade trigger assembly 124 and the blade carriage assembly 152 are moved forward. In particular, as the blade trigger assembly 124 is moved toward the front of the utility knife 101, the blade carriage assembly 152 is also moved forward because of the direct connection between those two components. When the slider knob 127 is moved forward, a connection between the trigger slide 129 and the blade carriage extension arm 164 causes the cutting blade 101 in the blade holder 155 to be extended. Additionally, the forward movement of the blade carriage assembly 152 causes the tension component 177 to be stretched so that the cutting blade 101 can be automatically retracted when the slider knob 127 is released.

Figure 9A:
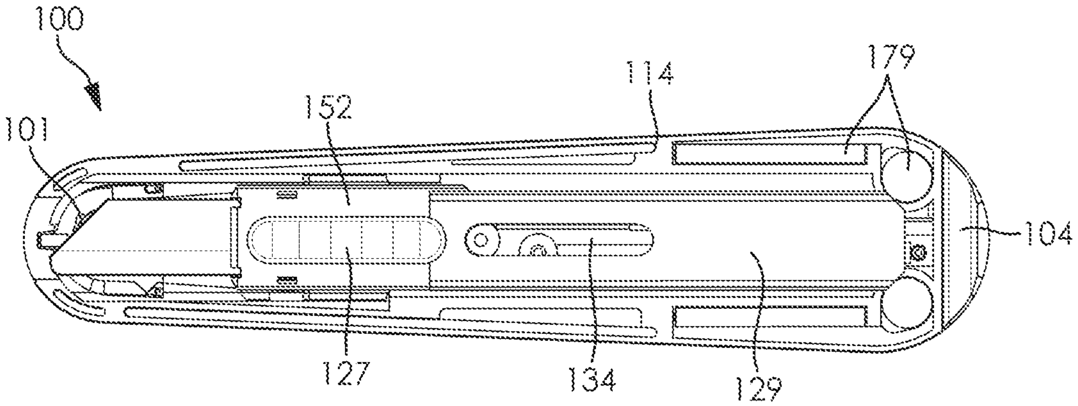
FIGS. 9A and 9B are left-side and right-side internal views of a utility knife with the cutting blade in retracted position in accordance with a second embodiment of the present invention utilizing a slider knob blade trigger.
Figure 9B:
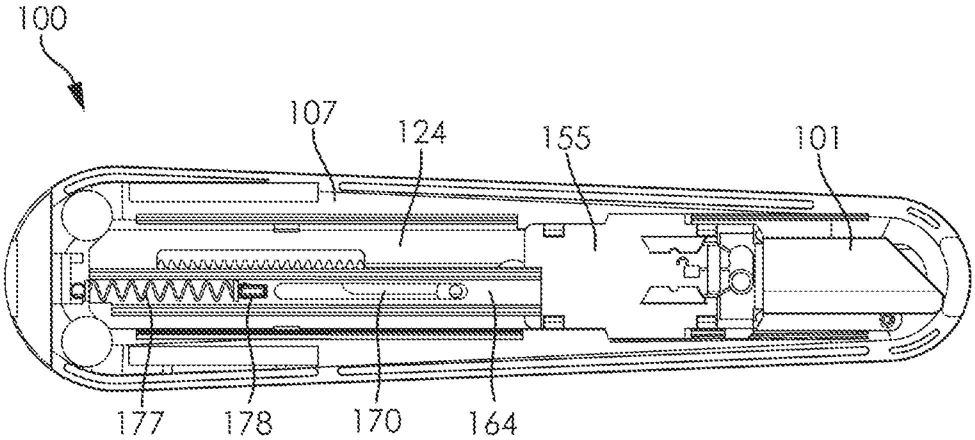

Turning now to FIGS. 9A and 9B, left-side and right-side internal views of an automatically retractable utility knife with a direct connection between the blade trigger assembly and the blade carriage assembly and a cutting blade in the retracted position, in accordance with an embodiment of the present invention. In some embodiments, the cutting blade 101 is retracted when the blade trigger assembly 124 and the blade carriage assembly 152 are positioned toward the rear of the utility knife 101. In particular, tension from the tension component 177 biases the blade carriage assembly 152, and therefore the blade trigger assembly 124, toward the rear of the utility knife 100. When the slider knob 127 is released, the tension component causes the blade carriage assembly 152 to move rearward and the cutting blade 101 to be retracted. Furthermore, the connection between the trigger slide 129 and the blade carriage extension arm 164 causes the blade trigger assembly 124 to move back to the retracted position as the tension component 177 simultaneously retracts the blade carriage assembly 152.

Figure 10A:
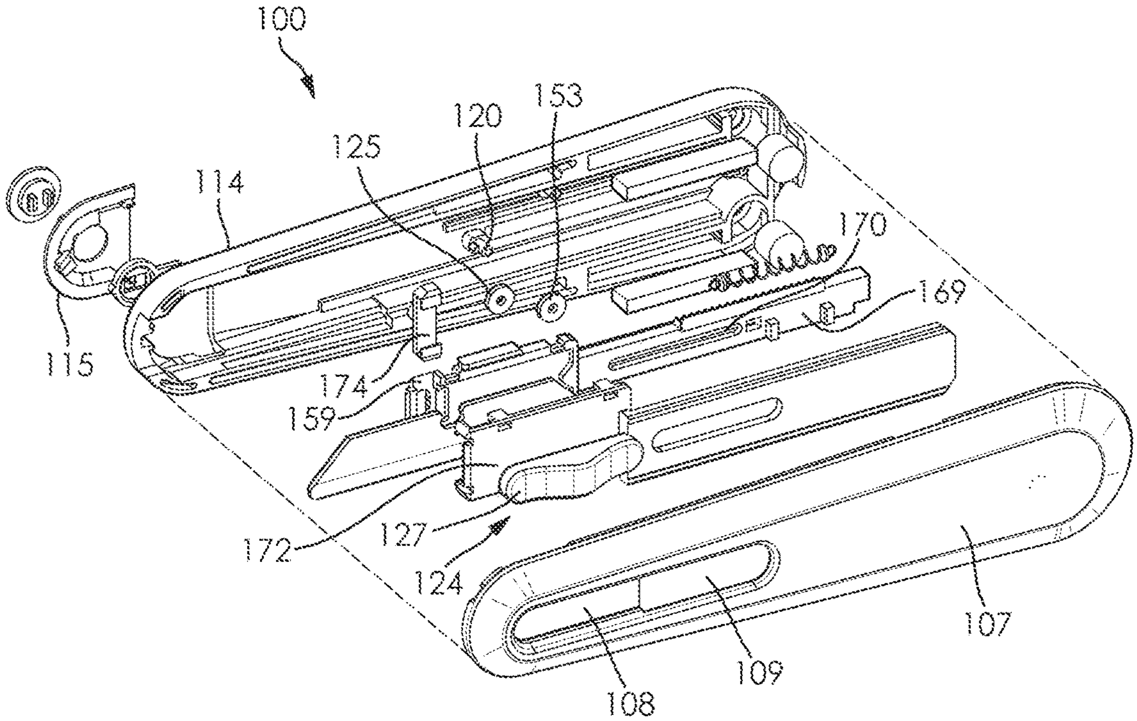
FIGS. 10A and 10B are front, left-side and front, right-side exploded perspective views of a utility knife in accordance with a second embodiment of the present invention utilizing a slider knob blade trigger.
Figure 10B:
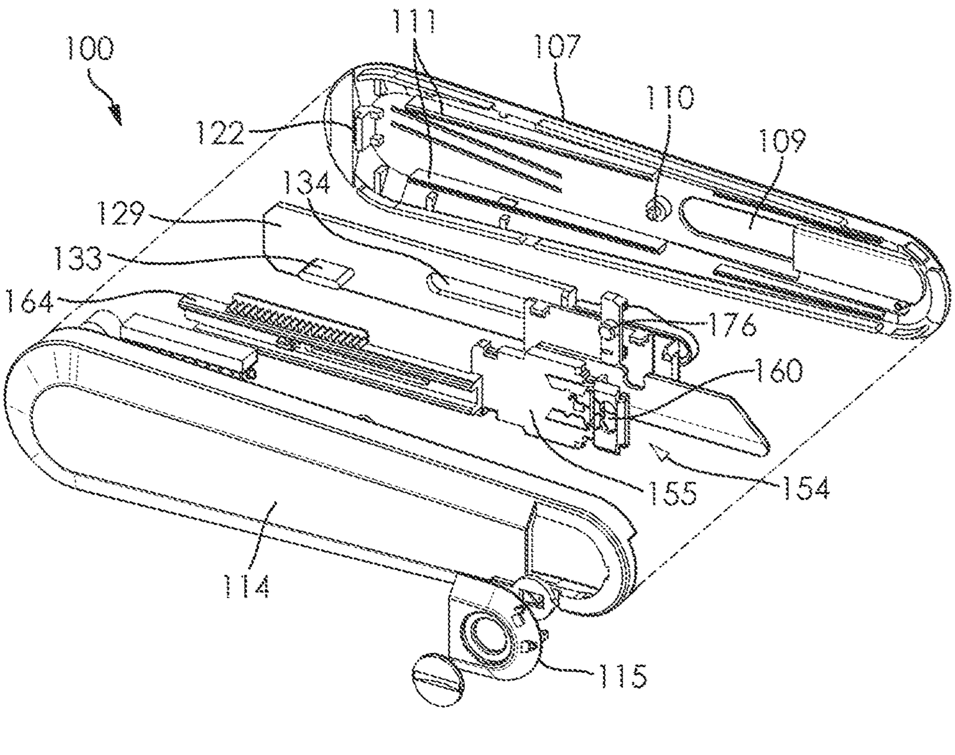

Turning now to FIGS. 10A and 10B, front, left-side and front, right-side exploded perspective views of an automatically retractable utility knife with a direct connection between the blade trigger assembly and the blade carriage assembly, in accordance with an embodiment of the present invention. In some embodiments, the utility knife 100 primarily comprises a housing shell and a blade actuation mechanism. In some embodiments, the housing shell comprises a left-half 107 and right-half 114 that are configured to retain the blade actuation mechanism. The blade trigger channel 108 and blade trigger opening 109 are formed on the exterior surface of the left-half housing shell 107. The interior surface of the left-half housing shell 107 also includes the blade trigger post 110, the blade trigger track 111, the front housing engagement means 113, and the rear housing engagement means 122. A blade access panel 115 on the right-half housing shell 114, provides access to the cutting blade 101. The interior surface of the right-half housing shell 114 includes the blade carriage post 120. In some embodiments, the blade actuation mechanism primarily comprises a blade trigger assembly 124 and a blade carriage assembly. The blade trigger assembly comprises 124 the blade trigger washer 125 and the blade trigger. The blade trigger comprises the slider knob 127 and the trigger slide 129, which is formed with the carriage engagement post 133 and the slider post slot 134. The carriage engagement post 133 is adapted to engage with the flanges 169 formed on the blade carriage extension arm 164. The slider post slot 134 allows the blade trigger post 110 to pass through the trigger slide 129. By passing through the trigger slide 129, the blade trigger post 110 can guide and limit the movement of the blade trigger, while also providing an attachment point for the blade trigger washer 125. The blade carriage assembly comprises the blade carriage washer 153, the blade carriage 154, the blade holder cover 172, and the blade retention pin 174. The blade carriage 154 comprises the blade holder 155 and the blade carriage extension arm 164. The blade holder 155 is formed with a retention pin channel 159 that is adapted to receive the blade retention pin 174. The retention pin channel 159 also includes a lock slot 160 that receives a post 176 formed on the rear of the blade retention pin 174. The blade carriage extension arm 164 is formed with a carriage post slot 170, which allows the blade carriage post 120 to pass through the blade carriage extension arm 164. By passing through the blade carriage extension arm 164, the blade carriage post 120 can guide and limit the movement of the blade carriage 154, while also providing an attachment point for the blade carriage washer 153.

Figure 11:
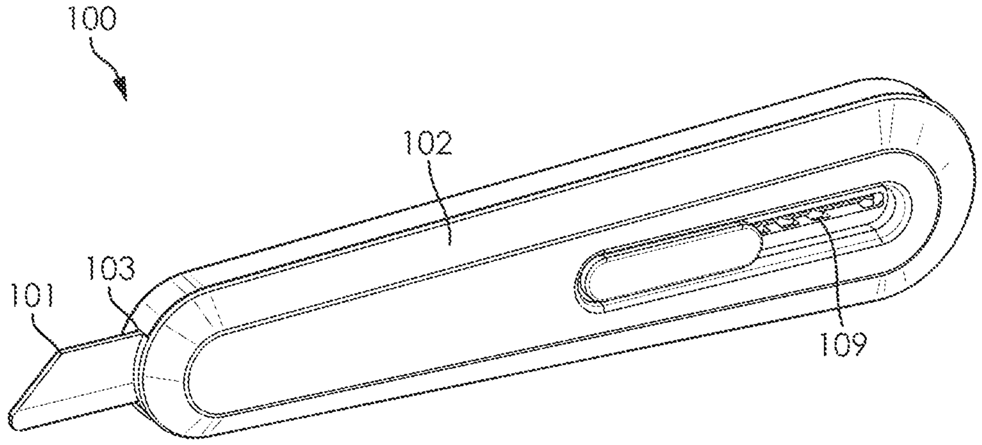
FIG. 11 is a front, left-side perspective view of a utility knife in accordance with a third embodiment of the present invention utilizing a slider knob blade trigger.

Turning now to FIG. 11, a front, left-side perspective view of a manually retractable utility knife with a direct connection between the blade trigger assembly and the blade carriage assembly, in accordance with an embodiment of the present invention. In some embodiments, the utility knife 100 primarily comprises a housing shell 102 configured to internally retain a blade actuation mechanism. In some embodiments, the blade actuation mechanism features a blade trigger assembly and blade carriage assembly that are directly connected. The direct connection between the blade trigger assembly and the blade carriage assembly enables a user to extend the cutting blade 101 through the blade outlet slot 103 at the front edge of the utility knife 100 by sliding the blade trigger 126 of the blade trigger assembly towards the front of the blade trigger channel 108 formed at the rear portion of the utility knife 100.

Figure 12A:
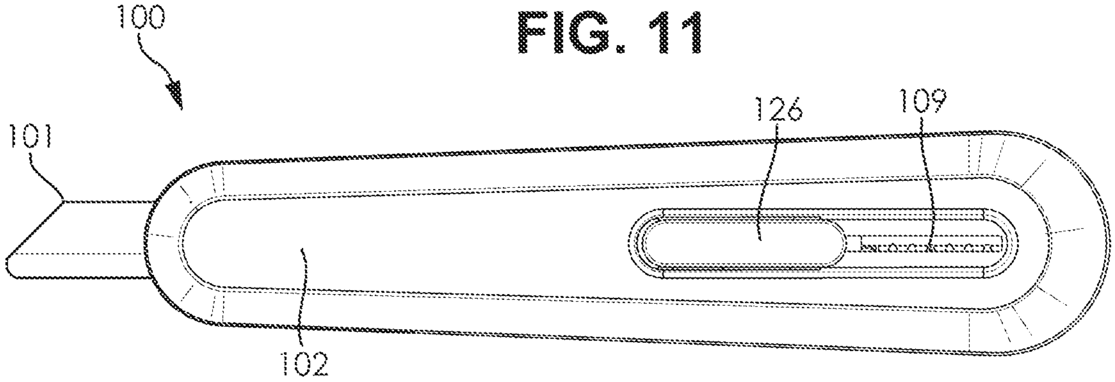
FIGS. 12A and 12B are left-side views of a utility knife in accordance with a third embodiment of the present invention utilizing a slider knob blade trigger.
Figure 12B:
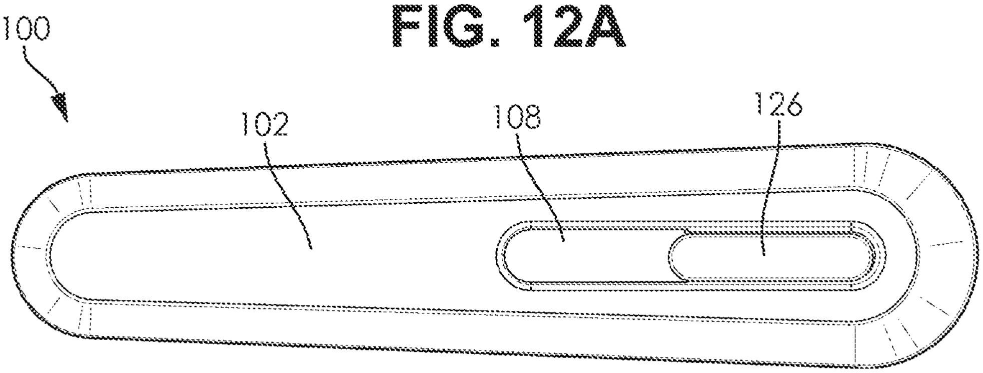

Turning now to FIGS. 12A and 12B, left-side views of an manually retractable utility knife with a direct connection between the blade trigger assembly and the blade carriage assembly, in accordance with an embodiment of the present invention. As shown in FIG. 12A, the direct connection between the blade trigger assembly and the blade carriage assembly enables a user to extend the cutting blade 101 by sliding the blade trigger 126 of the blade trigger assembly towards the front of the blade trigger channel 108 that is formed at the rear of the housing shell 102. As shown in FIG. 12B, the cutting blade is retracted when the blade trigger 126 is in the rearward position. Additionally, FIG. 12A, illustrates that the blade trigger 126 of the blade trigger assembly passes through a blade trigger opening 109 that is formed in the blade trigger channel 108.

Figure 13A:
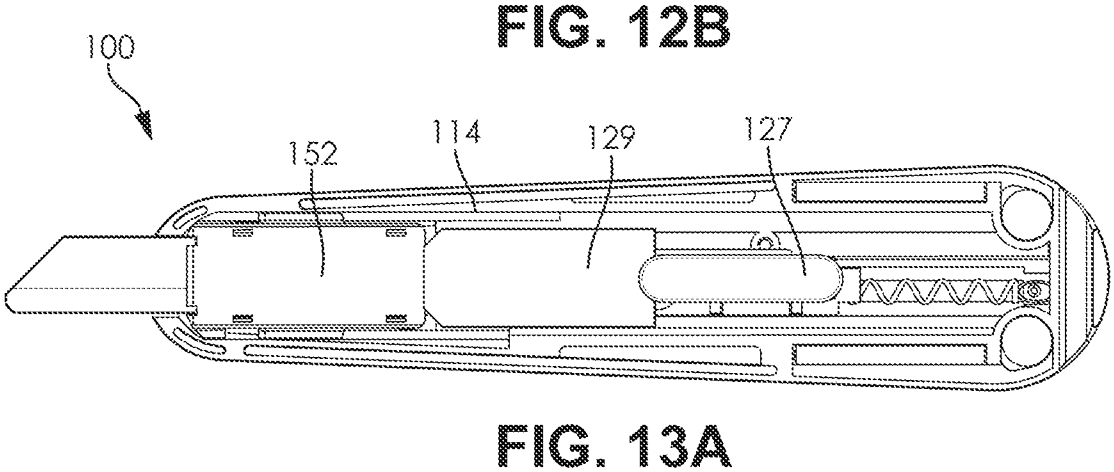
FIGS. 13A and 13B are left-side and right-side internal views of a utility knife with the cutting blade in an extended position in accordance with a third embodiment of the present invention utilizing a slider knob blade trigger.
Figure 13B:
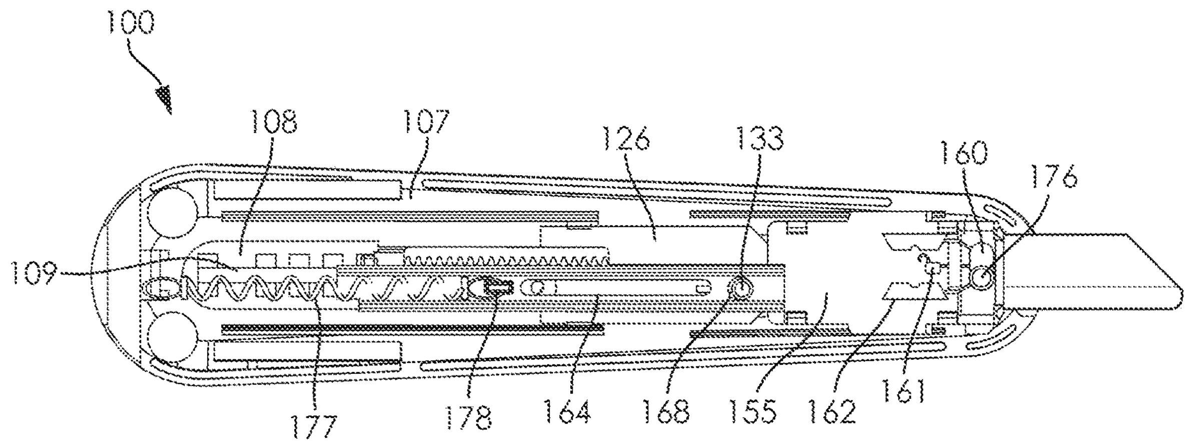

Turning now to FIGS. 13A and 13B, left-side and right-side internal views of a manually retractable utility knife with a direct connection between the blade trigger assembly and the blade carriage assembly and a cutting blade in the extended position, in accordance with an embodiment of the present invention. In some embodiments, the cutting blade is extended when the blade trigger and the blade carriage assembly 152 is moved toward the front of the utility knife 100. In particular, as the blade trigger is moved toward the front of the utility knife 101, the blade carriage assembly 152 is also moved forward because of the direct connection between those two components. The direct connection between the blade carriage assembly 152 and the blade trigger 126 is a connection between the carriage engagement post 133 on the rear of blade trigger 126 and a hole 168 on the blade carriage extension arm 164 causes the cutting blade in the blade holder 155 to be extended. When in the extended position, the button lock lever (not shown) engages with locking points formed on the inner surface of the blade trigger channel 108. In some embodiments, the blade holder 155 of the blade carriage 154 includes a retention pin lock indicator 161 and a blade orientation indicator 162. The blade orientation indictor 162 shows which way the post 176 on the rear of the retention pin should be moved within the lock slot 160 so that the retention pin securely locks the cutting blade in place within the blade holder 155 based on the orientation of the cutting blade. When the post 176 on the rear of the retention pin is in the middle of the lock slot 160, which is indicated by the unlocked lock symbol of the retention pin lock indicator 161, the cutting blade can be removed from the blade holder 155.

Figure 14A:
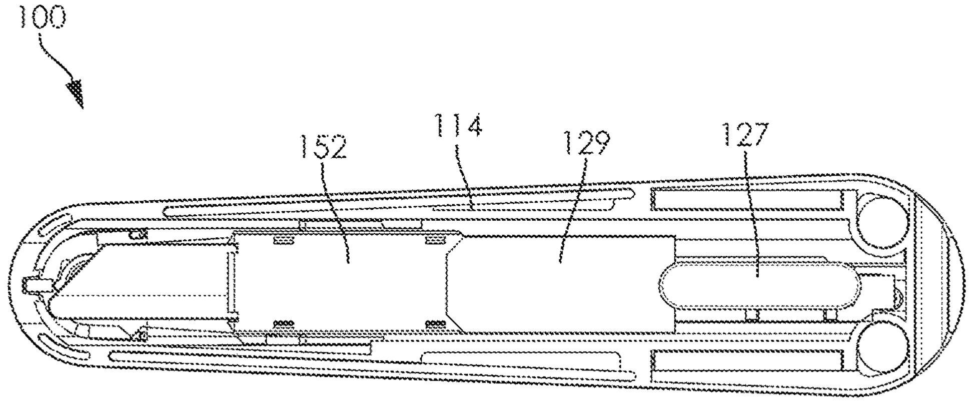
FIGS. 14A and 14B are left-side and right-side internal views of a utility knife with the cutting blade in retracted position in accordance with a third embodiment of the present invention utilizing a slider knob blade trigger.
Figure 14B:
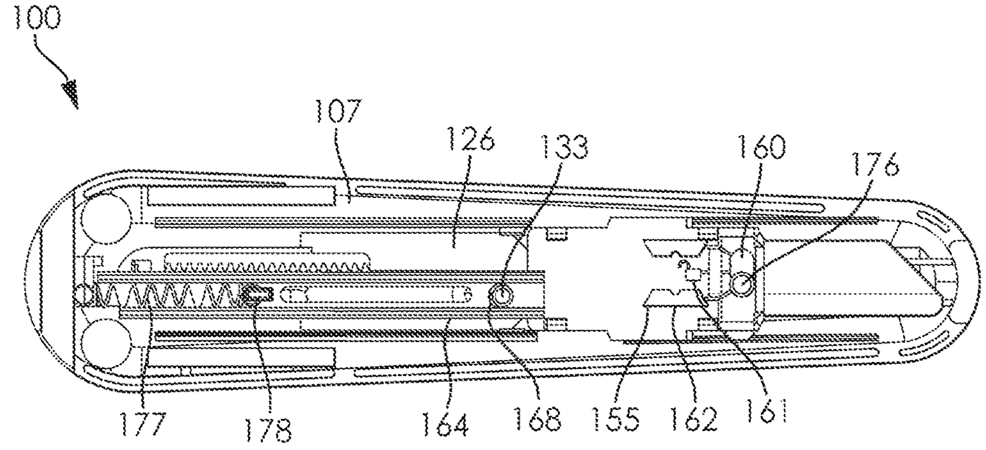

Turning now to FIGS. 14A and 14B, left-side and right-side internal views of a manually retractable utility knife with a direct connection between the blade trigger assembly and the blade carriage assembly and a cutting blade in the retracted position, in accordance with an embodiment of the present invention. In some embodiments, the cutting blade is retracted when the blade trigger 126 and the blade carriage assembly 152 is moved toward the rear of the utility knife 100. In particular, as the slider knob 127 and trigger slide 129 of the blade trigger 126 is moved toward the rear of the utility knife 101, the blade carriage assembly 152 is also moved rearward because of the direct connection between those two components. The direct connection between the blade carriage assembly 152 and the blade trigger 126 is a connection between the carriage engagement post 133 on the rear of blade trigger 126 and a hole 168 on the blade carriage extension arm 164 that causes the cutting blade in the blade holder 155 to be retracted. When in the extended position, the button lock lever (not shown) engages with locking points formed on the inner surface of the blade trigger channel 108.

Figure 15A:
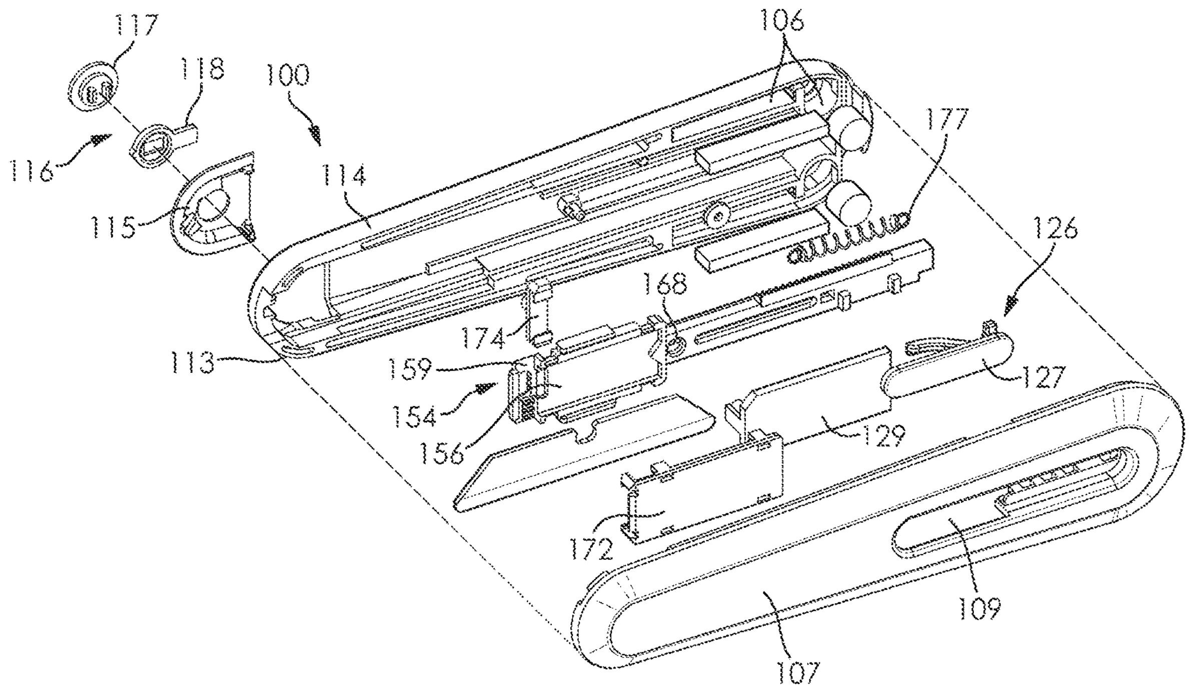
FIGS. 15A and 15B are front, left-side and front, right-side exploded perspective views of a utility knife in accordance with a third embodiment of the present invention utilizing a slider knob blade trigger.
Figure 15B:
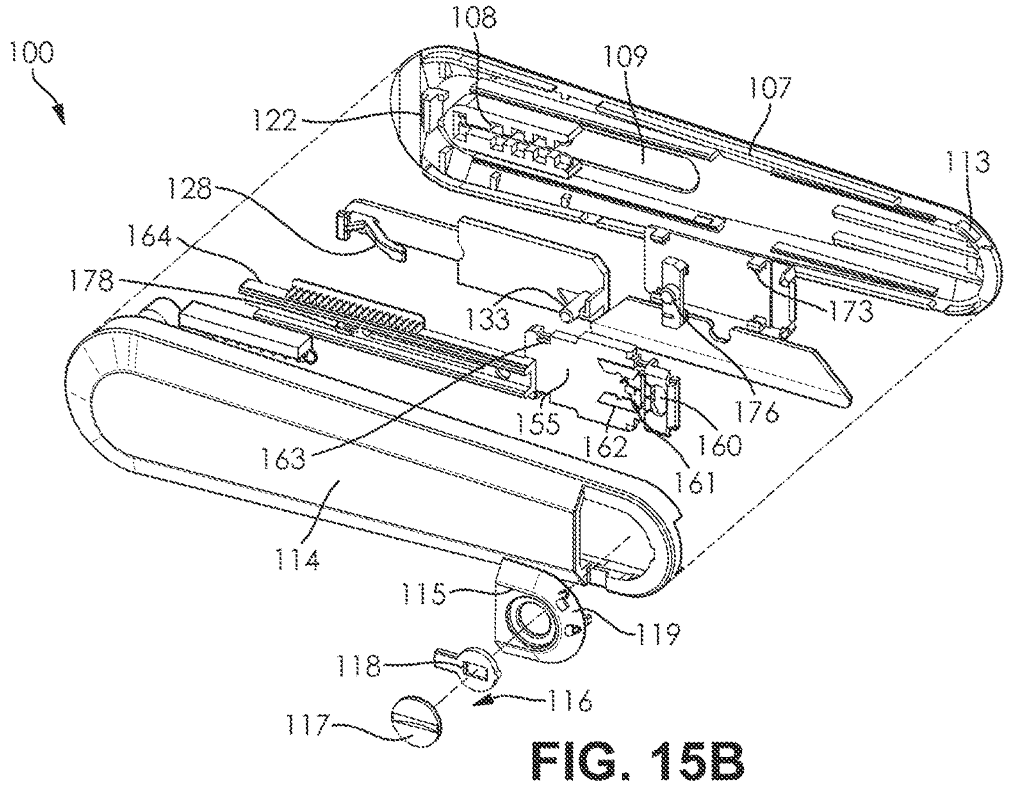

Turning now to FIGS. 15A and 15B, front, left-side and front, right-side exploded perspective views of a manually retractable utility knife with a direct connection between the blade trigger assembly and the blade carriage assembly, in accordance with an embodiment of the present invention. In some embodiments, the utility knife 100 primarily comprises a housing shell and a blade actuation mechanism. In some embodiments, the housing shell comprises a left-half 107 and right-half 114 that are configured to retain the blade actuation mechanism. The blade trigger channel 108 is a depression formed in the left-half housing shell 107, with a blade trigger opening 109 formed through the left-half housing shell. The interior surface of the left-half housing shell 107 also includes a series of locking points formed on the inner surface of the blade trigger channel 108, and the front housing engagement means 113, and the rear housing engagement means 122. A blade access panel 115 on the right-half housing shell 114, provides access to the cutting blade. The blade access panel 115 primarily comprises an access panel lock 116 formed from an outer slotted disk 117 and an inner latching component 118. The blade access panel may also include an access panel lock indicator 119. The interior surface of the right-half housing shell 114 includes the recesses 106 configured to retain the weights and the front housing engagement means 113. In some embodiments, the blade actuation mechanism primarily comprises a blade trigger 126 and a blade carriage assembly. The blade trigger 126 comprises the slider knob 127 and the trigger slide 129. A button lock lever 128 is formed on the rear of the slider knob 127 and is configured to pass through the blade trigger opening 109 such that the ends of each arm of the button lock lever 128 are inside of the housing shell. Inside the housing shell, the button lock lever 128 is adapted to both flexibly abut the blade carriage extension arm 164 and to engage with the locking points formed on the inner surface of the blade carriage channel 108. A blade carriage engagement post 133 is formed on the rear of the trigger slide 129 and is configured to engage with a hole 168 formed on the blade carriage extension arm 164. The blade carriage assembly comprises the blade carriage 154, the blade holder cover 172, and the blade retention pin 174. The blade carriage primarily comprises a blade holder 155 and a blade carriage extension arm 164. The blade holder 155 comprises a depression 156 formed to receive a cutting blade, a retention pin channel 159, a retention pin lock indicator 161, and the blade orientation indicator 162. The retention pin channel 159 is configured to receive the blade retention pin 174 and is also formed with a lock slot 160 that is adapted to receive post 176 formed on the rear of the blade retention pin 174. The blade holder cover 172 is formed with a plurality of attachment arms 173 that configured to attach the blade holder cover 172 to attachment points 163 on the blade holder 155.

Figure 16:
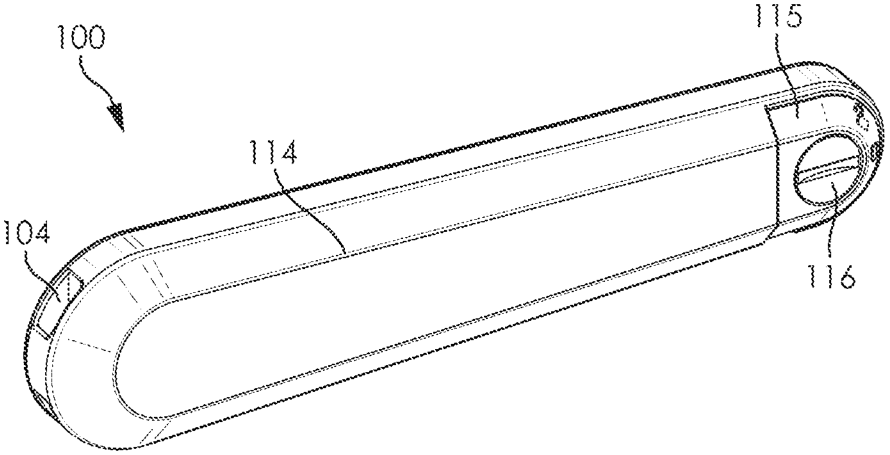
FIG. 16 is a rear, right-side perspective view of a utility knife in accordance with the embodiments of the present invention utilizing a slider knob blade trigger.

Turning now to FIG. 16, a rear, right-side perspective view of a utility knife, in accordance with an embodiment of the present invention. In a preferred embodiment, the right-half housing shell 114 of the utility knife 100 includes a lanyard attachment point 104 and a blade access panel 115. In the preferred embodiment, the blade access panel 115 comprises an access panel lock 116 that secures the blade access panel 115 in place on the right-half housing shell 114.

Figure 17:
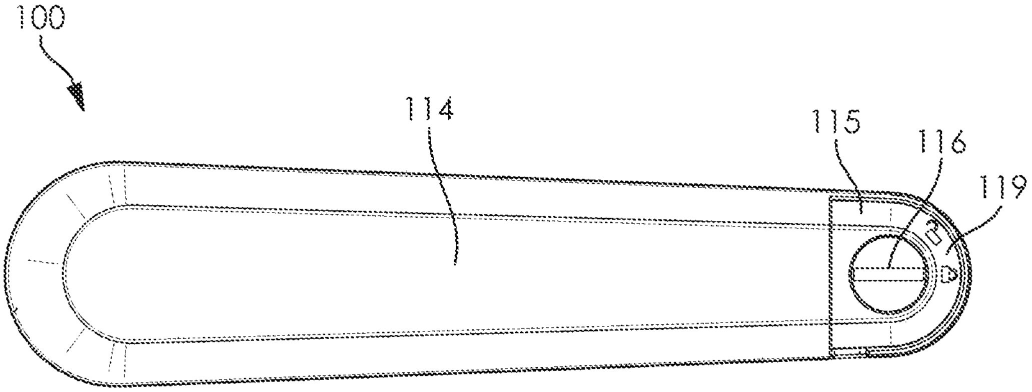
FIG. 17 is a right-side view of a utility knife in accordance with the embodiments of the present invention of the present invention utilizing a slider knob blade trigger.

Turning now to FIG. 17, a right-side view of a utility knife, in accordance with an embodiment of the present invention. In a preferred embodiment, the right-half housing shell 114 of the utility knife 100 includes a blade access panel 115. In the preferred embodiment, the blade access panel 115 comprises an access panel lock 116 that secures the blade access panel 115 in place on the right-half housing shell 114. An access panel lock indicator 119 shows whether the access panel lock 116 is in the locked position.

Figure 18:
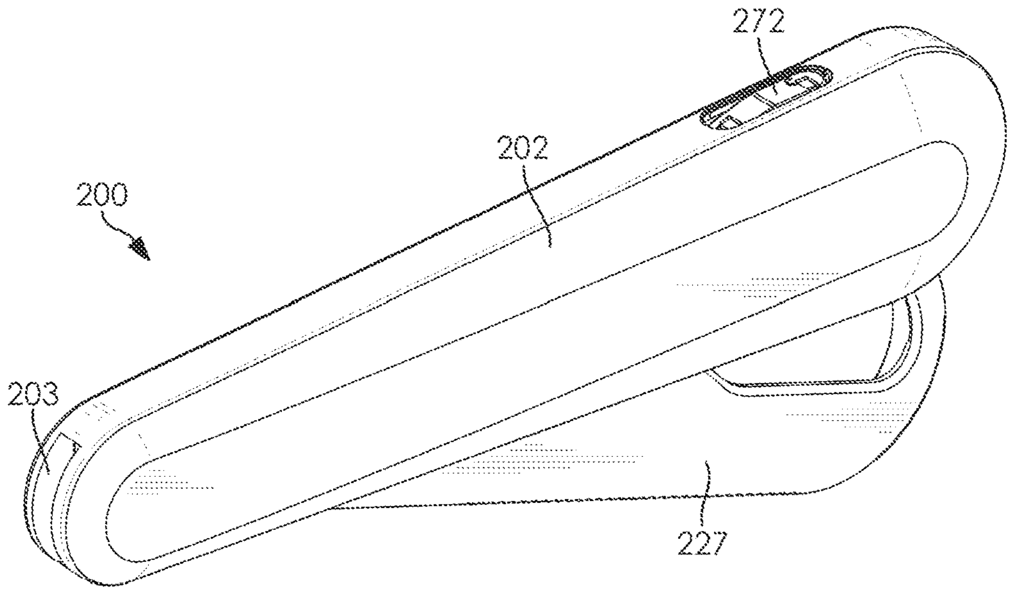
FIG. 18 is a front, left-side perspective view of a utility knife in accordance with embodiments of the present invention utilizing a squeeze lever blade trigger.

Turning now to FIG. 18, a front, left-side perspective view of a utility knife, in accordance with embodiments of the present invention utilizing a squeeze lever blade trigger. In a preferred embodiment, the utility knife 200 primarily comprises a housing shell 202 configured to internally retain a blade actuation mechanism. In the preferred embodiment, the squeeze lever 227 enables a user to extend a cutting blade through the blade outlet slot 203 at the front edge of the utility knife 200 by squeezing the squeeze lever 227 of the blade trigger assembly into the housing shell 202. In some embodiments, a blade trigger lock 272 is positioned in a top edge of the housing shell 202.

Figure 19A:
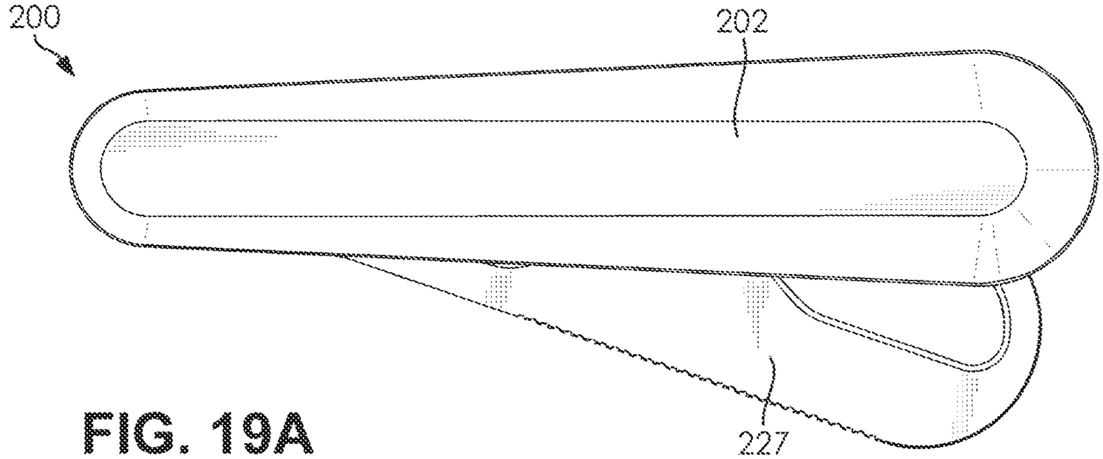
FIGS. 19A and 19B are left-side views of a utility knife in accordance with embodiments of the present invention utilizing a squeeze lever blade trigger.
Figure 19B:
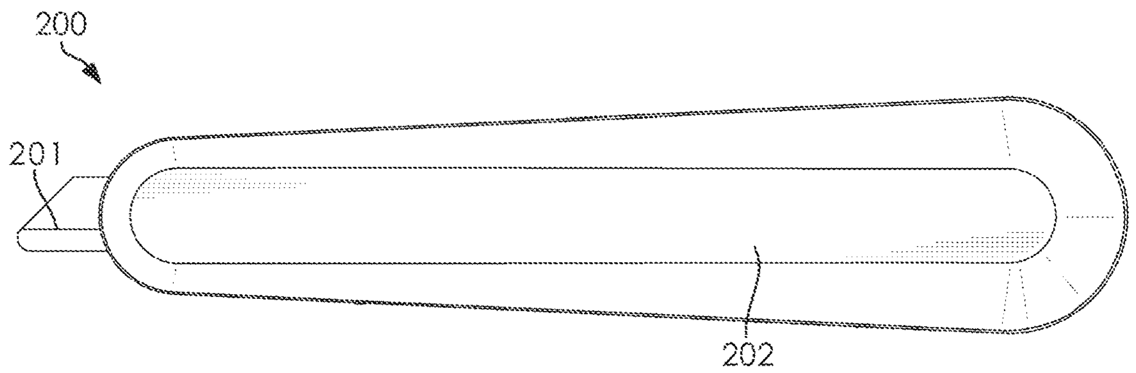

Turning now to FIGS. 19A and 19B, left-side views of a utility knife, in accordance with embodiments of the present invention utilizing a squeeze lever blade trigger. As shown in FIG. 19A, the cutting blade is retracted when the squeeze lever 227 is in the extended position, outside of the housing shell 202. As shown in FIG. 19B, the squeeze lever 227 enables a user to extend the cutting blade 201 by squeezing the squeeze lever 227 into the housing shell 202.

Figure 20:
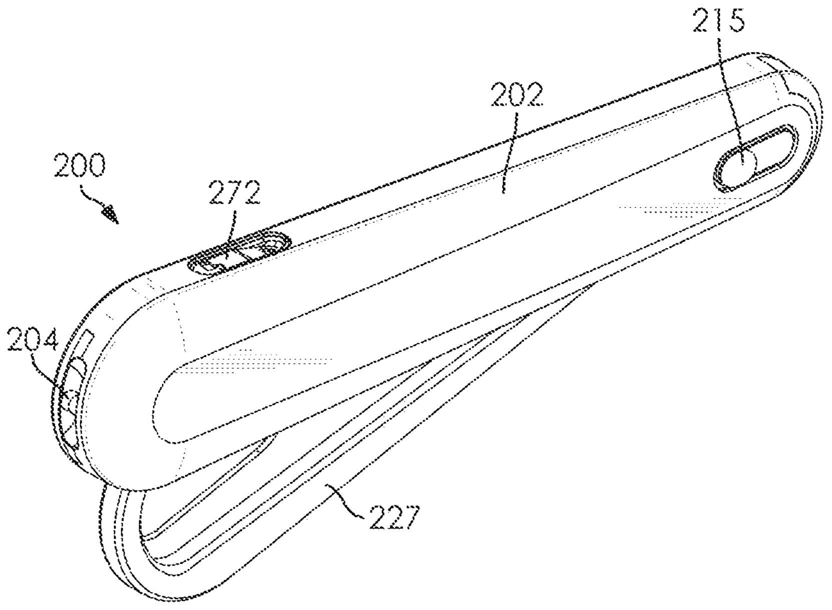
FIG. 20 is a rear, right-side perspective view of a utility knife in accordance with embodiments of the present invention utilizing a squeeze lever blade trigger.

Turning now to FIG. 20, a rear, right-side perspective view of a utility knife, in accordance with embodiments of the present invention utilizing a squeeze lever blade trigger. In a preferred embodiment, the rear edge of the housing shell 202 of the utility knife 200 includes a lanyard attachment point 204. Furthermore, there is a blade release button 215 near the front on the housing shell 202. In some embodiments, a blade trigger lock 272 is positioned in a top edge of the housing shell 202.

Figure 21:
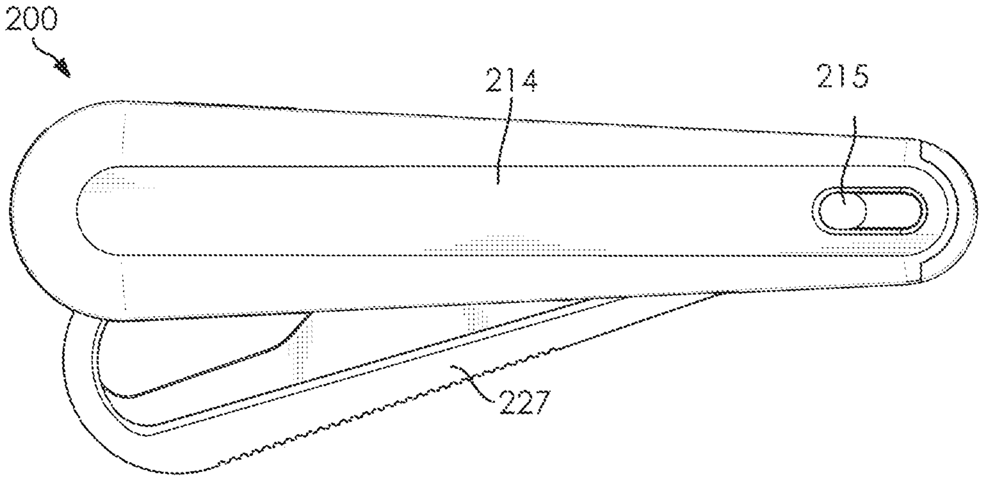
FIG. 21 is a right-side view of a utility knife in accordance with embodiments of the present invention utilizing a squeeze lever blade trigger.

Turning now to FIG. 21, a right-side view of a utility knife, in accordance with embodiments of the present invention utilizing a squeeze lever blade trigger. In a preferred embodiment, the right-half housing shell 214 of the utility knife 200 includes a a blade release button 215.

Figure 22A:
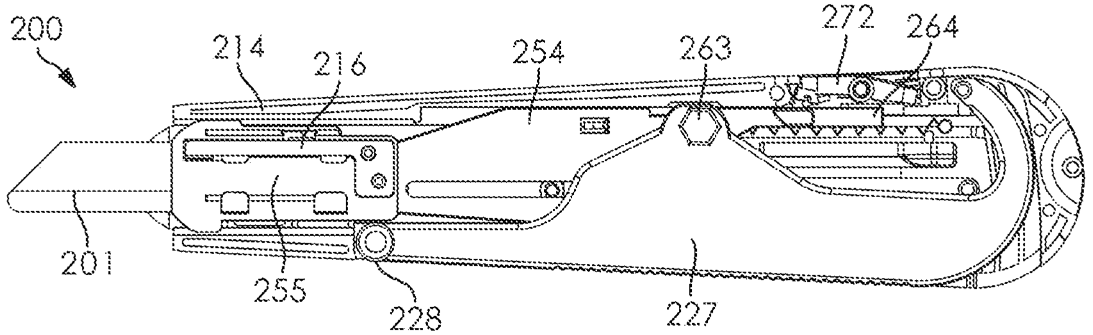
FIGS. 22A and 22B are left-side and right-side internal views of a utility knife with the cutting blade in an extended position in accordance with a first embodiment of the present invention utilizing a squeeze lever blade trigger.
Figure 22B:
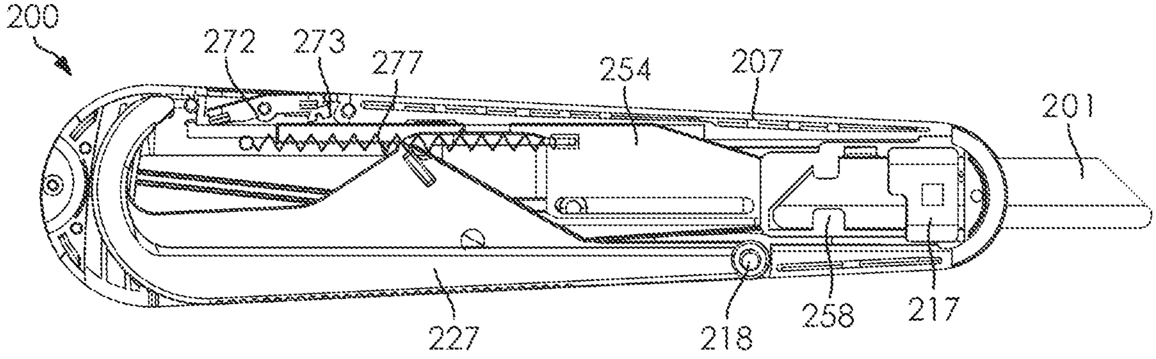
Figure 23A:
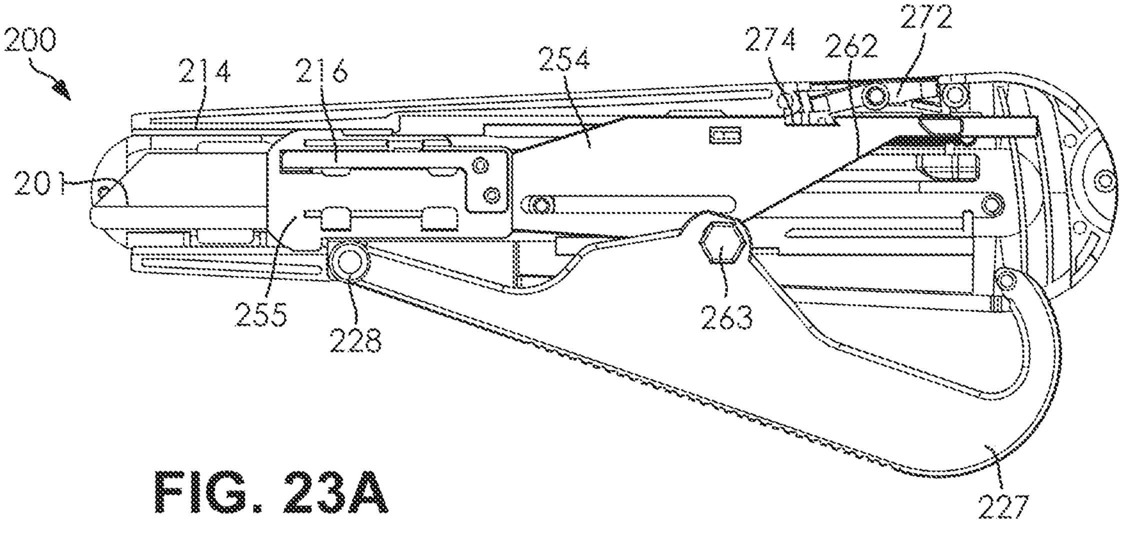
FIGS. 23A and 23B are left-side and right-side internal views of a utility knife with the cutting blade in retracted position in accordance with a first embodiment of the present invention utilizing a squeeze lever blade trigger.
Figure 23B:
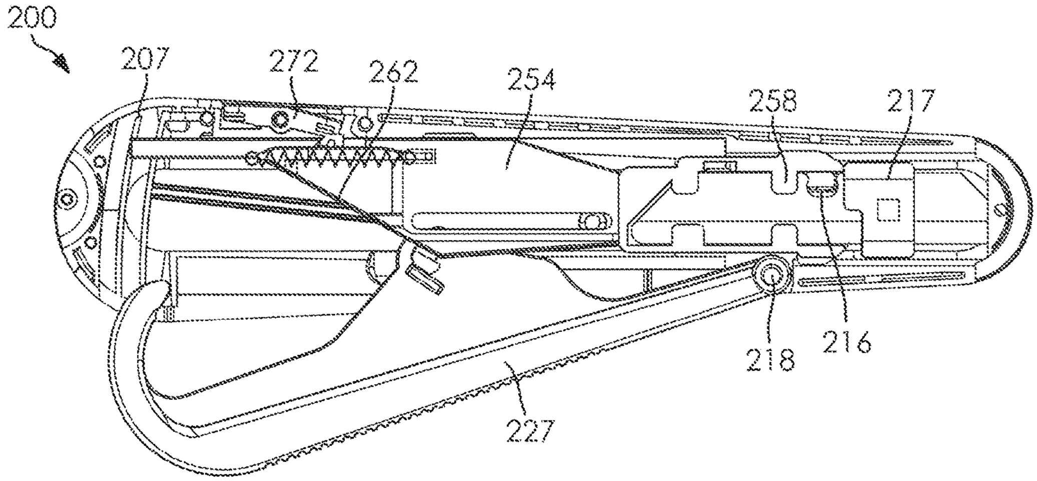

Turning now to FIGS. 22A and 22B, front and rear internal views of an automatically retractable utility knife with a direct connection between the blade trigger assembly and the blade carriage assembly and a cutting blade in the extended position, in accordance with embodiments of the present invention utilizing a squeeze lever blade trigger. In a preferred embodiment, the cutting blade 201 is extended when the squeeze lever 227 of the blade trigger assembly is squeezed into the housing shell 202. In particular, as the squeeze lever 227 of the blade trigger assembly is squeezed into the housing shell 202, the blade carriage 254 is moved forward because of the direct connection between those two components. When the squeeze lever 227 is squeezed, the slidable engagement between the lever ramp pivot point 263 of the squeeze lever 227 and the squeeze lever ramp 262 (as shown by FIGS. 23A and 23B) of the blade carriage extension arm 264 causes the cutting blade 201 in the blade holder 255 to be extended. Additionally, the forward movement of the blade carriage 254 causes the tension component 277 to be stretched so that the cutting blade 201 can be automatically retracted when the squeeze lever 227 is released.

Turning now to FIGS. 23A and 23B, front and rear internal views of an automatically retractable utility knife with a direct connection between the blade trigger assembly and the blade carriage assembly and a cutting blade in the extended position, in accordance with embodiments of the present invention utilizing a squeeze lever blade trigger. In some embodiments, the cutting blade 201 is retracted when the squeeze lever 227 of the blade trigger assembly is in the extended position outside of the housing shell and the blade carriage 254 is positioned toward the rear of the utility knife 201. In particular, tension from the tension component 277 biases the blade carriage 254 toward the rear of the utility knife 200. When the squeeze lever 227 is released, the tension component 227 causes the blade carriage 254 to move rearward and the cutting blade 201 to be retracted. Furthermore, the connection between the squeeze lever 227 and the blade carriage 254 causes the squeeze lever 227 to move back to the extended position outside of the housing shell as the tension component 277 retracts the blade carriage 254.

Figure 24A:
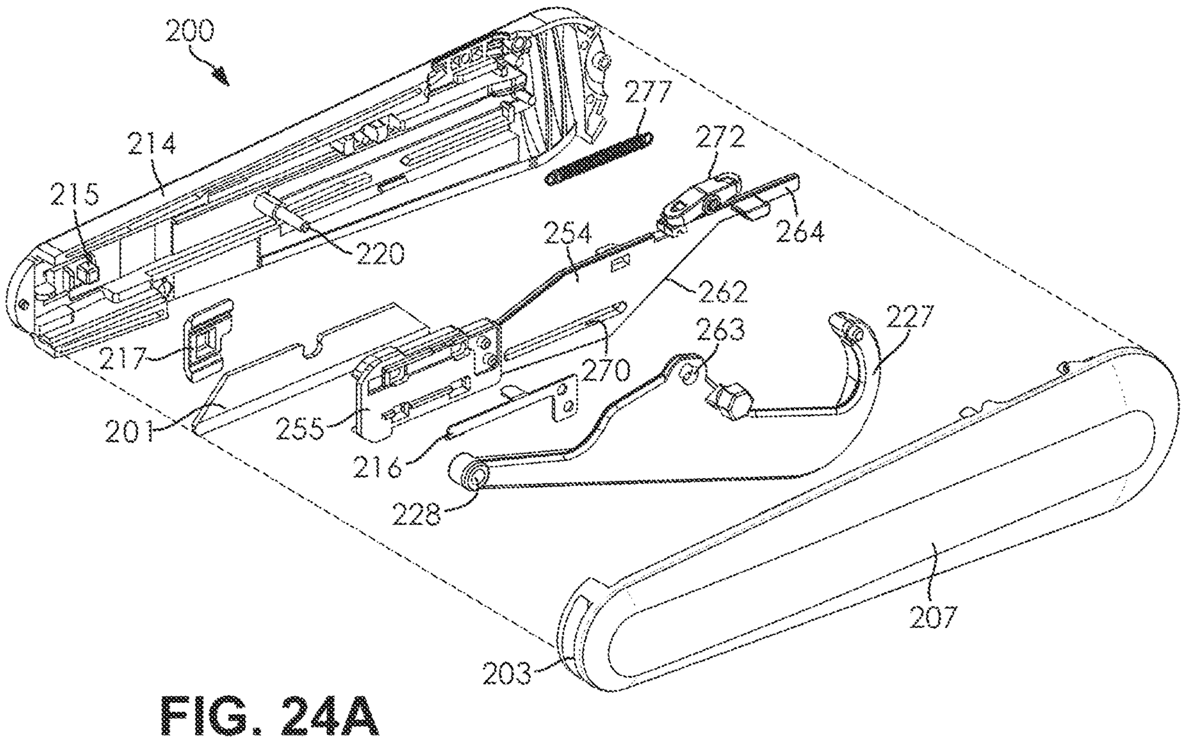
FIGS. 24A and 24B are front, left-side and rear, right-side exploded perspective views of a utility knife in accordance with a first embodiment of the present invention utilizing a squeeze lever blade trigger.
Figure 24B:
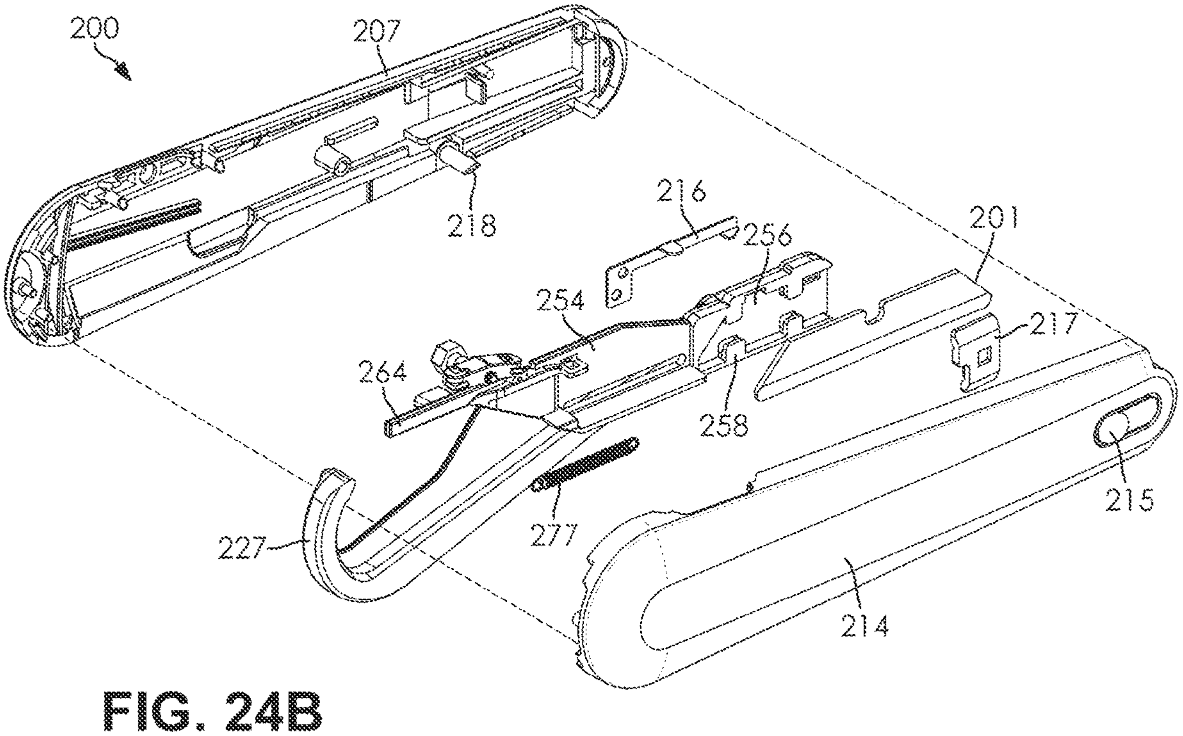

Turning now to FIGS. 24A and 24B, front, left-side and front, right-side exploded perspective views of an automatically retractable utility knife with a direct connection between the blade trigger assembly and the blade carriage assembly, in accordance with embodiments of the present invention utilizing a squeeze lever blade trigger. In a preferred embodiment, the utility knife 200 primarily comprises a housing shell, a blade actuation mechanism, and a blade trigger lock 272. In some embodiments, the housing shell comprises a left-half 207 and right-half 214 that are configured to retain the blade actuation mechanism. The interior surface of the left-half housing shell 207 includes the front housing engagement means, the squeeze lever post 218, and the rear housing engagement means. A blade release button 215 on the right-half housing shell 214, provides a means for releasing the cutting blade 201 from the blade holder 255 by pressing against the blade release tab 216 so as to disengage the blade release tab 216 from a notch formed in the cutting blade 201. In some embodiments, the blade release pressure plate 217 cooperates with the blade release button 215 to flex the blade release tab 216 and release the cutting blade 201. The interior surface of the right-half housing shell 214 includes the blade carriage post 220. In some embodiments, the blade actuation mechanism primarily comprises a squeeze lever 227 and a blade carriage 254. The squeeze lever 227 comprises a squeeze lever pivot point 228 and lever ramp pivot point 263. The blade carriage 254 comprises a blade holder 255 and blade carriage extension arm 264. The blade holder 255 is formed with blade retention prongs 258 that are adapted to hold the cutting blade 201 within the depression 256 of the blade holder 255. The blade holder 255 is also adapted to retain the blade release tab 216. The blade carriage extension arm 264 is formed with a carriage post slot 270, which allows the blade carriage post 220 to pass through the blade carriage extension arm 264. By passing through the blade carriage extension arm 264, the blade carriage post 220 can guide and limit the movement of the blade carriage 254. The blade carriage extension arm 264 is also formed with a squeeze lever ramp 262, which slidably engages with the lever ramp pivot point 263 of the squeeze lever 227. The angle of the squeeze lever ramp 262, in cooperation with the with the lever ramp pivot point 263 of the squeeze lever 227, guides the movement of the squeeze lever 227 so that movement of the squeeze lever 227 can be transferred to the blade carriage 254 to extend the cutting blade 201. The squeezing motion of the squeeze lever 227 is further facilitated by the squeeze lever pivot 228 point rotating about the squeeze lever post 218 on interior surface of the right-half housing shell 207.

Figure 25A:
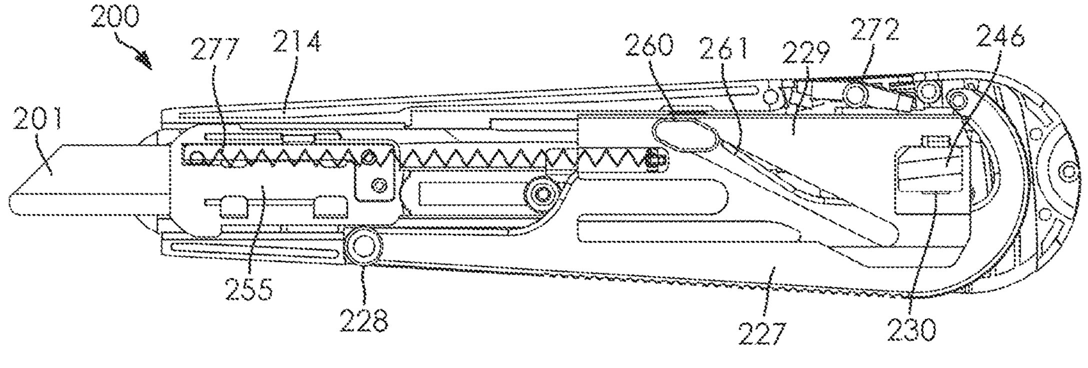
FIGS. 25A and 25B are left-side and right-side internal views of a utility knife with the cutting blade in an extended position in accordance with a second embodiment of the present invention utilizing a squeeze lever blade trigger.
Figure 25B:
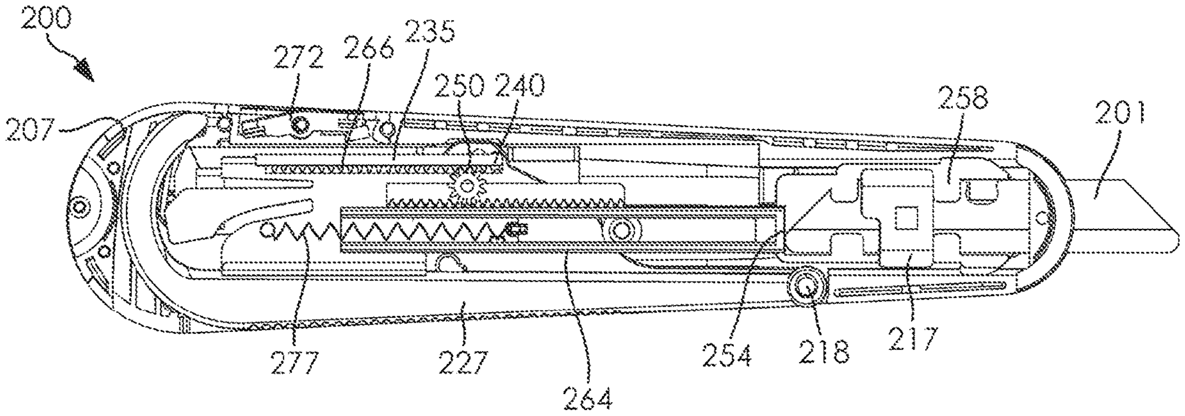

Turning now to FIGS. 25A and 25B, front and rear internal views of a utility knife with a rack-and-pinion blade actuation mechanism and a cutting blade in the extended position, in accordance with embodiments of the present invention utilizing a squeeze lever blade trigger. In a preferred embodiment, the cutting blade 201 is extended when the squeeze lever 227 of the blade trigger assembly is squeezed into the housing shell. In particular, as the squeeze lever 227 of the blade trigger assembly is squeezed into the housing shell, the blade carriage 254 is moved forward because of the rack-and pinion connection between those two components. In the preferred embodiment, the movement of the squeeze lever 227 into the housing shell 202, along with the rearward movement trigger slide 229 and slider rack 235 are transferred to the blade carriage 254 via a pinion gear 250. In particular, as the squeeze lever 227 is moved into the housing shell of the utility knife 201, the trigger slide pivot point 260 of the squeeze lever 227 slides within the squeeze lever slot 261 formed in the trigger slide 229, which causes the trigger slide 229 to move toward the rear of the utility knife 200. As the trigger slide 229 moves rearward, a hooked portion of the rack lever latching post of the slider pin 246 engages with a corresponding hooked portion of the lever arm extending from the main body of the slider rack 235 thereby causing the slider rack 235 to be moved toward the rear of the utility knife 200. Furthermore, as the trigger slide 229 and slider rack 235 are moved towards the rear of the utility knife 200, the interaction between the grooves on the slider pin 246 and the corresponding slider pin groves on the left-half housing shell 207 causes the slider pin 246 to move up within the slider pin recess 230, which in turn causes the slider pin 246 to flex the lever arm of the slider rack 235. As the slider rack 235 is moved towards the rear of the utility knife, a linear gear 240 on the slider rack 235 causes rotation of a pinion gear 250, which is in turn transferred to a linear gear 266 formed on the blade carriage extension arm 264. As a result, the inward movement of the squeeze lever 227 causes the forward movement of the blade carriage 254 so that the cutting blade 201 within the blade holder 255 can be extended. Additionally, the forward movement of the blade carriage 255 causes the tension component 277 to be stretched so that the cutting blade 201 can be automatically retracted when the cutting blade 201 is removed from the cutting surface. As the cutting blade 201 is pulled along a cutting surface, the blade carriage 254 is pulled slightly forward, this in turn causes the slider rack 235 to move slightly rearward due to the rack-and-pinion relationship between those components. When slider rack 235 moves slightly rearward, the lever arm of the slider rack 235 disengages from the slider pin 246 in the trigger slide 229 as the flex in the lever arm causes it to return to is relaxed position. With the lever arm disengaged from the slider pin 246, the slider rack 235 and blade carriage 254 become disconnected from the trigger slide 229, thereby allowing the tension components 277 to respectively (i) return the blade carriage 254 to the retracted position when the cutting blade 201 is removed from the cutting surface and (ii) the blade trigger assembly to the extended position when the squeeze lever 227 is released.

Figure 26A:
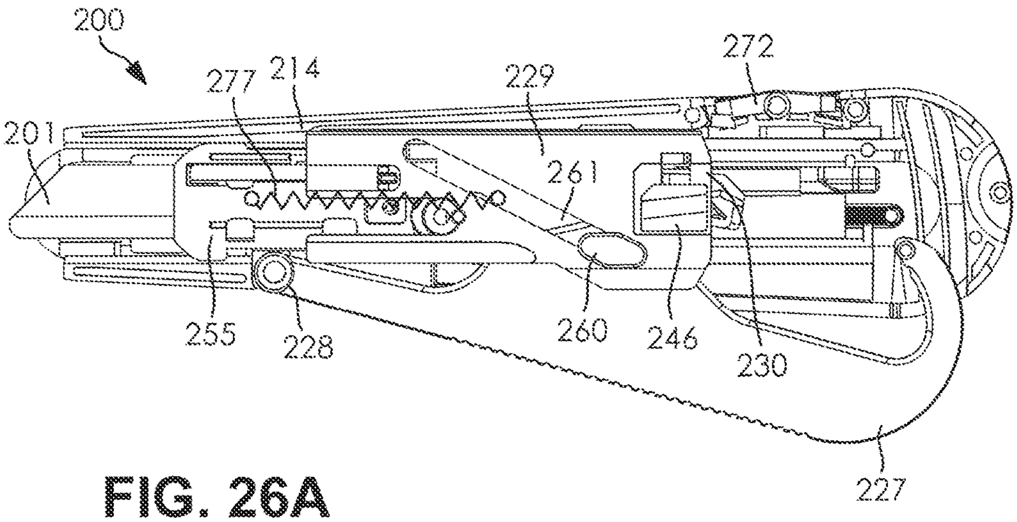
FIGS. 26A and 26B are left-side and right-side internal views of a utility knife with the cutting blade in retracted position in accordance with a second embodiment of the present invention utilizing a squeeze lever blade trigger.
Figure 26B:
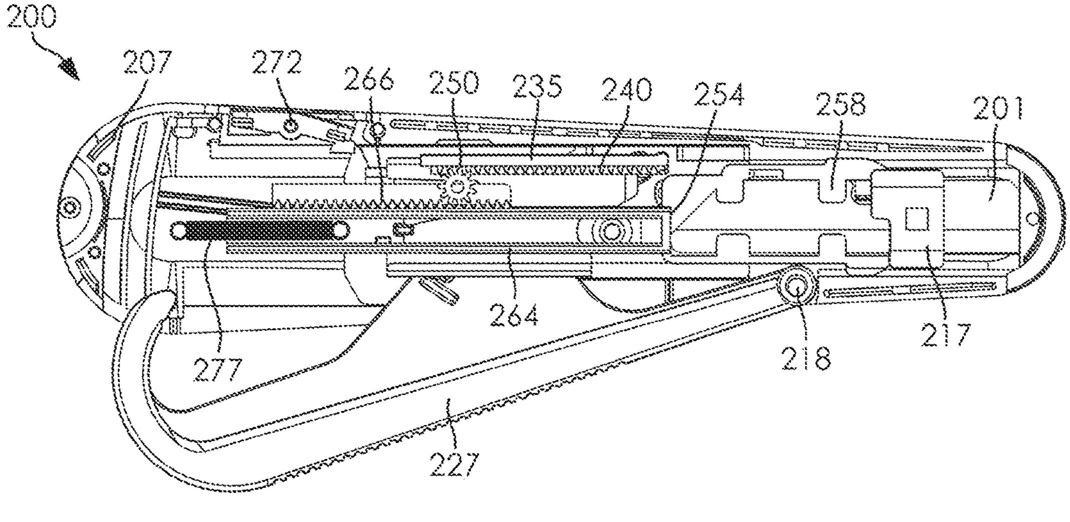

Turning now to FIGS. 26A and 26B, front and rear internal views of a utility knife with a rack-and-pinion blade actuation mechanism and a cutting blade in the retracted position, in accordance with embodiments of the present invention utilizing a squeeze lever blade trigger. In a preferred embodiment, the cutting blade 201 is retracted when the blade carriage assembly 252 is in the rear position and the squeeze lever 227 is in the extended position. When the cutting blade 201 is removed from the cutting surface, the blade carriage 254 is automatically retracted toward the rear of the utility knife 200 by a tension component 277 because the lever arm of the slider rack 235 has been disconnected from the slider pin 246 of the trigger slide 229 and there is no linkage to hold the cutting blade 201 in the extended position. Furthermore, as the blade carriage 254 is being retracted toward the rear of the utility knife 200 to retract cutting blade 201, the linear gear 266 on the blade carriage extension arm 264 causes rotation of a pinion gear 250, which is in turn transferred to the linear gear 240 formed on the slider rack 235, thereby causing the slider rack 235 to move toward the front of the utility knife 200 independently of the squeeze lever 227. When the squeeze lever 227 is released, a separate tension component 277 attached to the trigger slide 229 causes the trigger slide 229 to return to the retracted position in the forward portion of the housing shell, which in turn causes squeeze lever 227 to return to the extended position outside of the housing shell. As the trigger slide 229 returns to the retracted position, the ribbing on the slider pin 246 and the slider pin grooves in the left-half housing shell 207 cause the slider pin 246 to move back to its starting position within the slider pin recess 230 and to reengage with the lever arm of the slider rack 235.

Figure 27A:
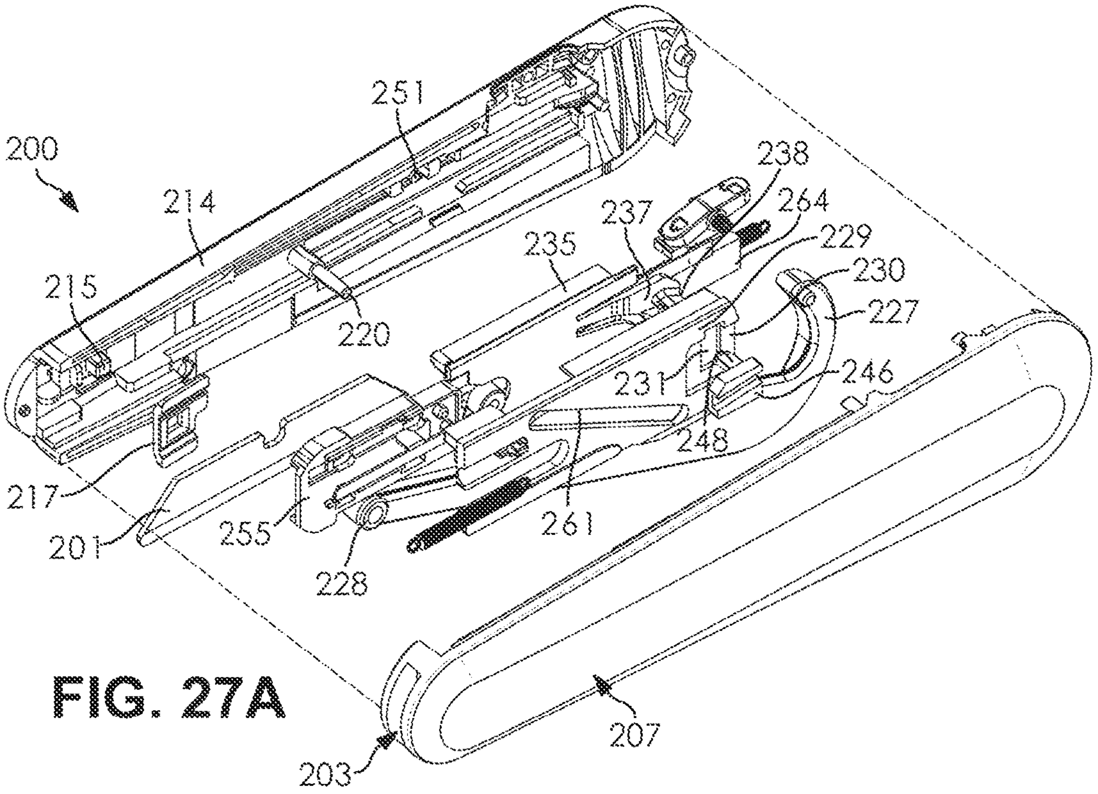
FIGS. 27A and 27B are front, left-side and rear, right-side exploded perspective views of a utility knife in accordance with a second embodiment of the present invention utilizing a squeeze lever blade trigger.
Figure 27B:
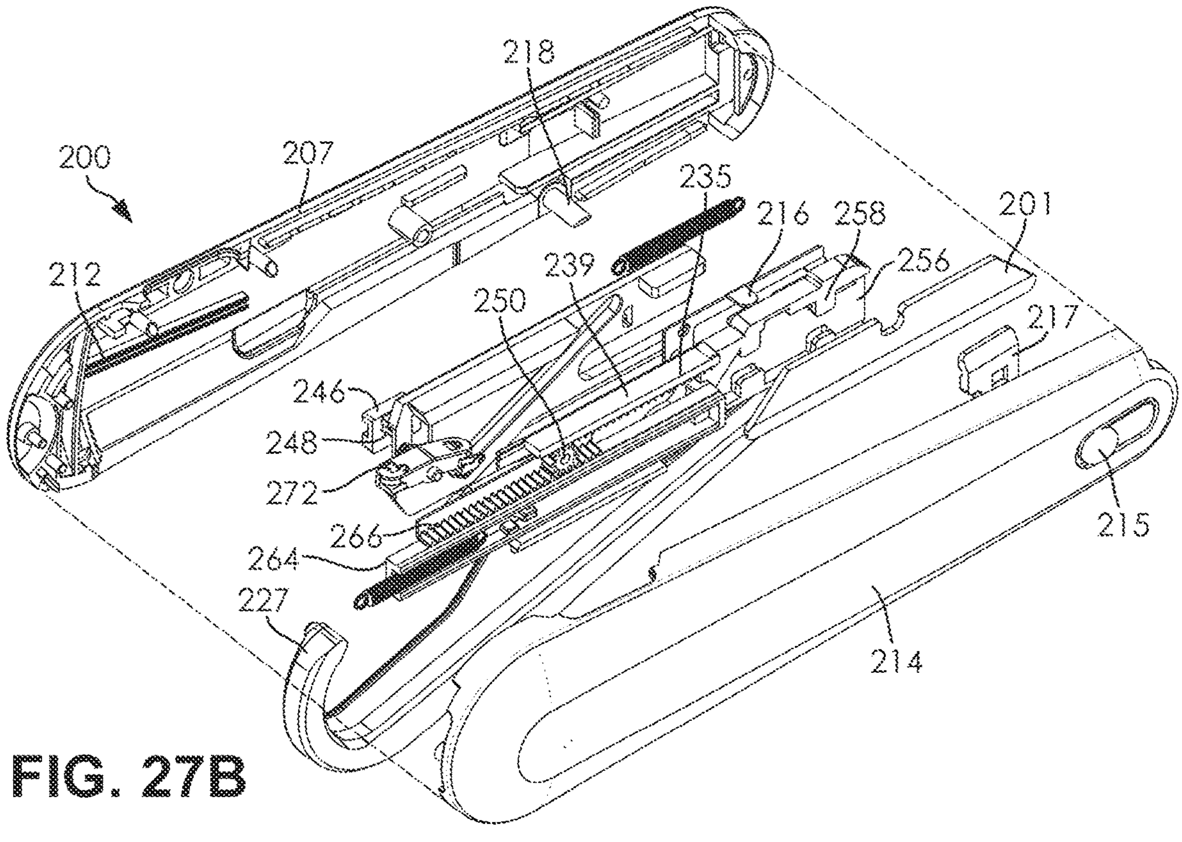

Turning now to FIGS. 27A and 27B, front, left-side and front, right-side exploded perspective views of a utility knife with a rack-and-pinion blade actuation mechanism, in accordance with embodiments of the present invention utilizing a squeeze lever blade trigger. In a preferred embodiment, the utility knife 200 primarily comprises a housing shell, a blade actuation mechanism, and a blade trigger lock 272. In some embodiments, the housing shell comprises a left-half 207 and right-half 214 that are configured to retain the blade actuation mechanism. The interior surface of the front-half housing shell 207 includes the slider pin grooves 212, the front housing engagement means, the squeeze lever post 218, and the rear housing engagement means. A blade release button 215 on the right-half housing shell 214, provides a means for releasing the cutting blade 201 from the blade holder 255 by pressing against the blade release tab 216 so as to disengage the blade release tab 216 from a notch formed in the cutting blade 201. In some embodiments, the blade release pressure plate 217 cooperates with the blade release button 215 to flex the blade release tab 216 and release the cutting blade 201. The interior surface of the right-half housing shell 214 includes the front housing engagement means, the blade carriage post 220, the rear housing engagement means, and the pinion gear post 251. In some embodiments, the blade actuation mechanism primarily comprises a blade trigger assembly, a blade carriage assembly, and a pinion gear 250. The blade trigger assembly comprises the blade trigger, the slider rack 235, and the slider pin 246. The blade trigger comprises the squeeze lever 227 and the trigger slide 229. The squeeze lever 227 comprises a squeeze lever pivot point 228 and trigger slide pivot point. The trigger slide 229 is formed with the slider pin recess 230 and the squeeze lever slot 261. The slider rack 235 comprises a main body portion formed with a lever arm 237 with a catch portion 238, and an upper lip 239 with a linear gear on the underside thereof. The catch portion 238 of the lever arm 237 engages with hooked portion of the rack lever latching post 248. The slider pin 246 comprises a ribbed front plate portion and a rack lever latching post 248 with a hooked portion. The rack lever latching post 248 passes through a hole 231 in the slider pin recess 230 of the trigger slide 229 and engages with the lever arm 237 of the slider rack 235. The blade carriage 254 comprises a blade holder 255 and blade carriage extension arm 264. The blade holder 255 is formed with blade retention prongs 258 that are adapted to hold the cutting blade 201 within the depression 256 of the blade holder 255. The blade holder 255 is also adapted to retain the blade release tab 216. The blade carriage extension arm 264 is formed with a carriage post slot, which allows the blade carriage post 220 to pass through the blade carriage extension arm 264. By passing through the blade carriage extension arm 264, the blade carriage post 220 can guide and limit the movement of the blade carriage 254. The blade carriage extension arm 264 is also formed with a linear gear 266, which is configured to engage with the pinion gear 250. The rack-and-pinion relationship between the blade trigger assembly and blade carriage assembly that is facilitated by linear gear 266 of blade carriage extension arm 264, the pinion gear 250, and the linear gear on the slider rack 235, coverts the squeezing motion of the squeeze lever 227 into the forward motion of the blade carriage 254. The squeezing motion of the squeeze lever 227 is further facilitated by the squeeze lever pivot point 228 rotating about the squeeze lever post 218 on interior surface of the right-half housing shell 207.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A utility knife with an automatically retractable blade, comprising:
- a blade actuation mechanism comprising,
  - an actuator having a trigger and a trigger slide, wherein the trigger is movably disposed in a slot formed in a housing of the utility knife,
  - a blade carriage configured to retain a cutting blade, wherein the blade carriage is indirectly connected to the actuator,
  - a slider rack operably connected to the blade carriage and configured to reversibly connect with the trigger slide,
  - a tension component that is attached to the blade carriage, and
  - an indirect and detachable connection between the blade carriage and the trigger slide facilitated by the slider rack, wherein engaging the cutting blade with a cutting surface causes the blade carriage to be pulled forward and the slider rack to move rearward and disconnect from the trigger slide thereby interrupting the indirect and detachable connection and permitting the blade carriage to be automatically retracted by the tension component when the cutting blade is lifted from the cutting surface regardless of where the trigger is disposed within the slot.

2. The utility knife of claim 1, wherein the trigger is a slider knob.

3. The utility knife of claim 2, wherein the trigger and trigger slide are a singularly formed component, with the trigger slide being an extension arm extending from the slider knob.

4. The utility knife of claim 1, wherein the trigger is a squeeze lever.

5. The utility knife of claim 4, wherein the trigger and trigger slide are separate components.

6. The utility knife of claim 5, wherein the trigger and trigger slide are connected in a movable configuration.

7. The utility knife of claim 4, further comprising a blade trigger lock that is configured to toggle between a locked position and an unlocked position, wherein the locked position is characterized by a portion of the blade lock trigger blocking movement of one or more components of the blade actuation mechanism.

8. The utility knife of claim 7, wherein the blade trigger lock engages with the trigger slide when the blade trigger lock is in the locked position.

9. The utility knife of claim 7, wherein the blade trigger lock is on a top edge portion of the housing of the automatically retracting utility knife.

10. The utility knife of claim 1, further comprising a pinion gear positioned between a first linear gear formed on the blade carriage and a second liner gear formed on the slider rack, wherein the pinion gear, first linear gear, and second linear gear collectively facilitate a rack-and-pinion connection between the blade carriage and the slider rack.

* * * * *